US012774758B2

(12) United States Patent
Inoue et al.

(10) Patent No.: US 12,774,758 B2
(45) Date of Patent: Oct. 27, 2026

(54) TOGGLE-TYPE MANUAL VALVE AND VALVE UNIT

(71) Applicant: CKD CORPORATION, Komaki (JP)

(72) Inventors: Yutaka Inoue, Komaki (JP); Tatsuhito Aoyama, Komaki (JP)

(73) Assignee: CKD CORPORATION, Komaki (JP)

( * ) Notice: Subject to any disclaimer, the term of this patent is extended or adjusted under 35 U.S.C. 154(b) by 45 days.

(21) Appl. No.: 18/681,626

(22) PCT Filed: Mar. 7, 2023

(86) PCT No.: PCT/JP2023/008606
§ 371 (c)(1),
(2) Date: Feb. 6, 2024

(87) PCT Pub. No.: WO2023/189290
PCT Pub. Date: Oct. 5, 2023

(65) Prior Publication Data
US 2024/0376997 A1 Nov. 14, 2024

(30) Foreign Application Priority Data
Mar. 30, 2022 (JP) ................................ 2022-055374

(51) Int. Cl.
*F16K 31/528* (2006.01)
*F16K 31/60* (2006.01)
*F16K 35/06* (2006.01)

(52) U.S. Cl.
CPC .......... *F16K 31/528* (2013.01); *F16K 31/602* (2013.01); *F16K 35/06* (2013.01)

(58) Field of Classification Search
CPC ............. F16K 31/528; F16K 31/52491; F16K 31/5288; F16K 31/602; F16K 35/06; F16K 31/5286; Y10T 137/87885
(Continued)

(56) References Cited

U.S. PATENT DOCUMENTS 676,118 A * 6/1901 Billings .................. F16K 15/18 137/542
1,046,531 A * 12/1912 Wray ...................... F16K 35/10 70/210
(Continued)

FOREIGN PATENT DOCUMENTS

JP 2008-039156 A 2/2008
JP 4053118 B2 2/2008
(Continued)

OTHER PUBLICATIONS

May 23, 2023 International Search Report issued in International Patent Application No. PCT/JP2023/008606.
(Continued)

*Primary Examiner* — Nicole Gardner
(74) *Attorney, Agent, or Firm* — Oliff PLC

(57) ABSTRACT

A valve stem is disposed so as to be capable of moving linearly reciprocally in a case connected to a valve section for opening and closing a flow channel. The valve stem is urged toward the valve section by a spring. A manual lever is rotatably supported on the upper end of the valve stem. The valve stem is divided into a first rod part connected to the manual lever and a second rod part positioned on the valve section side, a connecting pin fixed to the first rod part is inserted through an elongated elongated hole formed in the second rod part along an axial direction, and the first rod part is able to move in the range of the elongated hole relative to the second rod section.

17 Claims, 18 Drawing Sheets

(58) Field of Classification Search
USPC .......................................................... 251/77, 81
See application file for complete search history.

(56) References Cited

U.S. PATENT DOCUMENTS 1,318,120 A * 10/1919 Wheaton ............... F16K 35/025 137/614.19
1,885,000 A * 10/1932 Muller .................. F16K 17/085 251/86
2,077,997 A * 4/1937 Hedene ................... F16K 35/10 137/384
2,212,486 A * 8/1940 Zoder ....................... F01L 1/00 220/88.1
2,615,465 A * 10/1952 Woodward ............. F16K 29/00 137/243.2
2,829,837 A * 4/1958 Willcox ............... G05D 23/126 236/35
2,968,464 A * 1/1961 Olson ................... F16K 31/408 251/38
3,026,908 A * 3/1962 Blair ....................... F16K 11/16 303/50
RE25,338 E * 2/1963 Olson ................... F16K 31/408 251/30.04
4,036,250 A * 7/1977 Dashner .............. F16K 17/0466 137/476
4,699,351 A * 10/1987 Wells .................... F16K 31/408 251/38
6,105,930 A * 8/2000 Nishimura .............. F16K 31/56 251/102
6,648,296 B2 * 11/2003 Hirose .................. F16K 27/003 251/77
8,070,130 B2 * 12/2011 Olberding ................. F16K 1/16 251/313
10,161,360 B2 * 12/2018 Ninomiya .......... F02M 21/0233
11,067,185 B2 * 7/2021 Jimenez .............. F16K 37/0008
2006/0145106 A1 * 7/2006 Takeda .................. F16K 31/143 251/29
2016/0341096 A1 11/2016 Kobori et al.
2020/0278046 A1 * 9/2020 Watanabe ......... F16K 31/52408

FOREIGN PATENT DOCUMENTS

JP 2015-137609 A 7/2015
WO 2005/038323 A1 4/2005

OTHER PUBLICATIONS

Sep. 24, 2024 International Preliminary Report on Patentability issued in International Patent Application No. PCT/JP2023/008606.
Jun. 18, 2025 Office Action issued in Korean Patent Application No. 10-2024-7004834.

* cited by examiner

TOGGLE-TYPE MANUAL VALVE AND VALVE UNIT

CROSS-REFERENCE TO RELATED APPLICATIONS

This is a US national phase application based on the PCT International Patent Application No. PCT/JP2023/008606 filed on Mar. 7, 2023, and claiming the priority to Japanese Patent Application No. 2022-055374 filed on Mar. 30, 2022, the entire contents of which are incorporated by reference herein.

TECHNICAL FIELD

The invention relates to a toggle-type manual valve that opens and closes a valve section by turning a manual lever.

BACKGROUND ART

For example, a gas line of a semiconductor production line uses a toggle-type manual valve that opens and closes a valve section by turning a manual lever. In a toggle-type manual valve disclosed in Patent Document 1, for example, a manual lever is pivotally supported at the end of a valve stem on the side opposite a valve section. When the manual lever is turned to a horizontal direction and placed in a horizontal position, the valve stem is urged by a spring to move in a direction toward the valve section, i.e., in a valve-section direction, and closes the valve section. On the other hand, when the manual lever is turned to a standing direction and placed in an inverted position, the valve stem is moved in a direction opposite the valve section against the spring, opening the valve section.

RELATED ART DOCUMENTS

Patent Documents

Patent Document 1: Japanese Patent No. 4053118

SUMMARY OF INVENTION

Problems to be Solved by the Invention

In the toggle-type manual valve described above, the valve stem is constituted of a single component. Therefore, for example, if the hand of an operator hits the manual lever and accidentally the manual lever, the valve stem is immediately moved following the manual lever, which may cause leakage unintended by the operator.

The art disclosed in the present description has been made to address the above problems and has a purpose to provide a toggle-type manual valve that opens and closes a valve section by turning a manual lever to suppress leakage unintended by an operator.

Means of Solving the Problems

One aspect of the art disclosed in the present description provides (1) a toggle-type manual valve comprising: a valve section that opens and closes a flow channel; a case connected to the valve section; a valve stem supported by the case to be able to linearly reciprocate toward the valve section; an urging member that urges the valve stem in a valve-section direction; and a manual lever pivotally supported to turn at an end of the valve stem on a side opposite the valve section, the toggle-type manual valve being configured to open and close the valve section by turning the manual lever, wherein the valve stem is divided into a first rod part connected to the manual lever and a second rod part located on a side close to the valve section, a pin is fixed to one of the first rod part and the second rod part, and the other of the first rod part and the second rod part has an elongated hole extending in an axial direction of the valve stem, through which the pin is inserted slidably.

The toggle-type manual valve configured as above allows the first rod part connected to the manual lever to move relative to the second rod part as long as the pin can move within the elongated hole. Accordingly, even if the hand of an operator hits the manual lever, causing the external force to act on the manual lever, only the first rod part moves following the manual lever, but the second rod part does not move. Thus, this toggle-type manual valve can suppress leakage unintended by the operator.

(2) In the toggle-type manual valve described in (1), preferably, the toggle-type manual valve has a thin rectangular parallelepiped outer shape with a width of 10 mm, and the manual lever is configured to pivot between a horizontal position, to which the manual lever is turned to a horizontal direction to close the valve section, and a standing position, to which the manual lever is turned to a standing direction to move the valve stem against the urging member.

According to the toggle-type manual valve configured as above, which suppresses the leakage unintended by the operator even though the width is as thin as 10 mm, it is easy to use even a unitized the toggle-type manual valves. Further, in the toggle-type manual valve, the manual lever is turned between two positions, the horizontal position and the standing position, so that the valve opened/closed state is easy to visually confirm.

(3) In the toggle-type manual valve described in (1) or (2), preferably, further comprising a lock rod member provided standing on an upper surface of the case on which the manual lever is placed, the lock rod member having an attachment hole to which a padlock is attached, and the manual lever being formed with an insertion hole through which the lock rod member is inserted.

According to the toggle-type manual valve configured as above, the lock rod member, to which the padlock is attached, is mounted on the upper surface of the case, so that the locking mechanism for preventing an accidental operation of the manual lever can be easily added.

(4) In the toggle-type manual valve described in (3), preferably, the upper surface of the case is formed with a first mounting hole and a second mounting hole, in which the lock rod member can be mounted, at symmetric positions across the valve stem, the lock rod member can be selectively mounted in either the first mounting hole or the second mounting hole, and at least a part of the first rod part has a columnar shape, to which the manual lever is attached, and the manual lever can be attached in a reversed orientation across the first rod part.

According to the toggle-type manual valve configured as above, the lock rod member can be selectively mounted in the first mounting hole or second mounting hole and further the orientation of the manual lever can be changed according to the position of the lock rod member. This makes it possible to change the orientation of the manual lever without being restricted by the flowing direction of a fluid, so that the toggle-type manual valve is easy to use.

(5) (In the toggle-type manual valve described in any one of (1) to (4), preferably, the urging member urges the second rod part in the valve-section direction, and when the valve section is in a valve closed state, a first gap is provided between the pin and an internal surface of the elongated hole, located on a side opposite the valve section, and further a second gap is provided between the second rod part and the first rod part.

According to the toggle-type manual valve configured as above, the first gap is formed between the pin and the inner surface of the elongated hole, located on the side opposite the valve section. Therefore, even if the hand hits the manual lever while the valve section is in a valve closed state, for example, the pin moves through the first gap and does not pull up, preventing fluid leakage. Further, in the toggle-type manual valve, the second gap prevents the second rod part from being subjected to the external forces other than the force applied by the urging member during valve closing. This configuration can prevent the valve section from being damaged by the external forces other than the urging member.

(6) In the toggle-type manual valve described in any one of (1) to (5), preferably, the first rod part and the second rod part are round rods having the same thickness, the first rod part has a first end portion located on a side close to the valve section and formed with a first protruding portion protruding toward the second rod part, the second rod part has a second end portion located on a side opposite the valve section and formed with a second protruding portion protruding toward the first rod part, and the pin is fixed to one of the first protruding portion and the second protruding portion, and the elongated hole is formed in the other of the first protruding portion and the second protruding portion.

According to the toggle-type manual valve configured as above, the first protruding portion of the first rod part and the second protruding portion of the second rod part are connected through the elongated hole as a compact structure, which can prevent fluid leakage caused by accidental operations of the manual lever.

(7) In the toggle-type manual valve described in (6), preferably, the first protruding portion has a semicircular cross-section cut in a direction perpendicular to an axial direction of the first rod part, and the second protruding portion has a semicircular cross-section cut in a direction perpendicular to an axial direction of the second rod part.

According to the toggle-type manual valve configured as above, the first rod part and the second rod part are connected within the region in which the valve stem is housed, so that the valve size can be compact.

(8) In the toggle-type manual valve described in (6), preferably, the second protruding portion is a plate-shaped protruding portion provided in a plate shape along a diametrical direction of the second rod part, the first protruding portion includes a pair of protrusions placed on both sides of the plate-shaped protruding portion, and the elongated hole is formed in the plate-shaped protruding portion, and the pin connecting is fixed to the pair of protrusions to extend in a direction perpendicular to an axis of the first rod part.

According to the toggle-type manual valve configured as above, the first rod part and the second rod part are connected within the region in which the valve stem is housed, so that the valve size can be compact. In addition, in the toggle-type manual valve, the pin is fixed to the paired protrusions arranged on both sides of the plate-shaped protruding portion. Thus, for example, when the first rod part pulls the second rod part in a direction opposite the valve section via the pin to open the valve, the load acts almost equally on the pin. Therefore, even when the valve is repeatedly opened and closed, the pin is less likely to come off from the first rod part.

Another aspect of the art disclosed in the present description provides (9) a valve unit in which a plurality of the toggle-type manual valves described in any one of (1) to (8) is provided contiguously, wherein the toggle-type manual valves are placed with the respective manual levers alternately oriented in opposite directions when the manual levers are pivoted to a horizontal direction to close the valve sections.

In the valve unit configured as above, the toggle-type manual valves are arranged contiguously with the respective manual levers oriented alternatively in different directions. Thus, the interval between adjacent manual levers is wider as compared with the case where the manual levers are oriented in the same one direction. Therefore, when manipulating one of the manual levers, an operator can avoid accidentally moving an adjacent manual lever together. Also, each of the toggle-type manual valves is less likely to cause leakage unintended by the operator, even if the external force acts on the toggle-type manual valve. Therefore, the valve unit configured as above can suppress leakage unintended by the operator from each toggle-type manual valve.

(10) In the valve unit described in (9), preferably, each of the manual levers of the plurality of toggle-type manual valves has a stopper part to be restricted by the case from further turning in a posture with a distal end portion turned beyond the valve stem when the manual lever is pivoted to a standing direction.

In the valve unit configured as above, when the manual levers arranged alternately in opposite directions are pivoted to the standing direction, the respective stopper parts restrict further turning of the manual levers in the posture with the distal end portions turned beyond the valve stems. Thus, when turning one manual lever horizontally, even if the operator touches an adjacent manual lever, the adjacent manual lever is not allowed to turn any further. In this way, only the toggle-type manual valve to be operated is closed and other toggle-type manual valves not to be operated are not closed. Thus, accidental operation is suppressed.

Effects of the Invention

According to the art disclosed in the present description, the toggle-type manual valve that opens and closes the valve section by turning the manual lever can suppress leakage unintended by an operator.

MODE FOR CARRYING OUT THE INVENTION

First Embodiment

Figure 1:
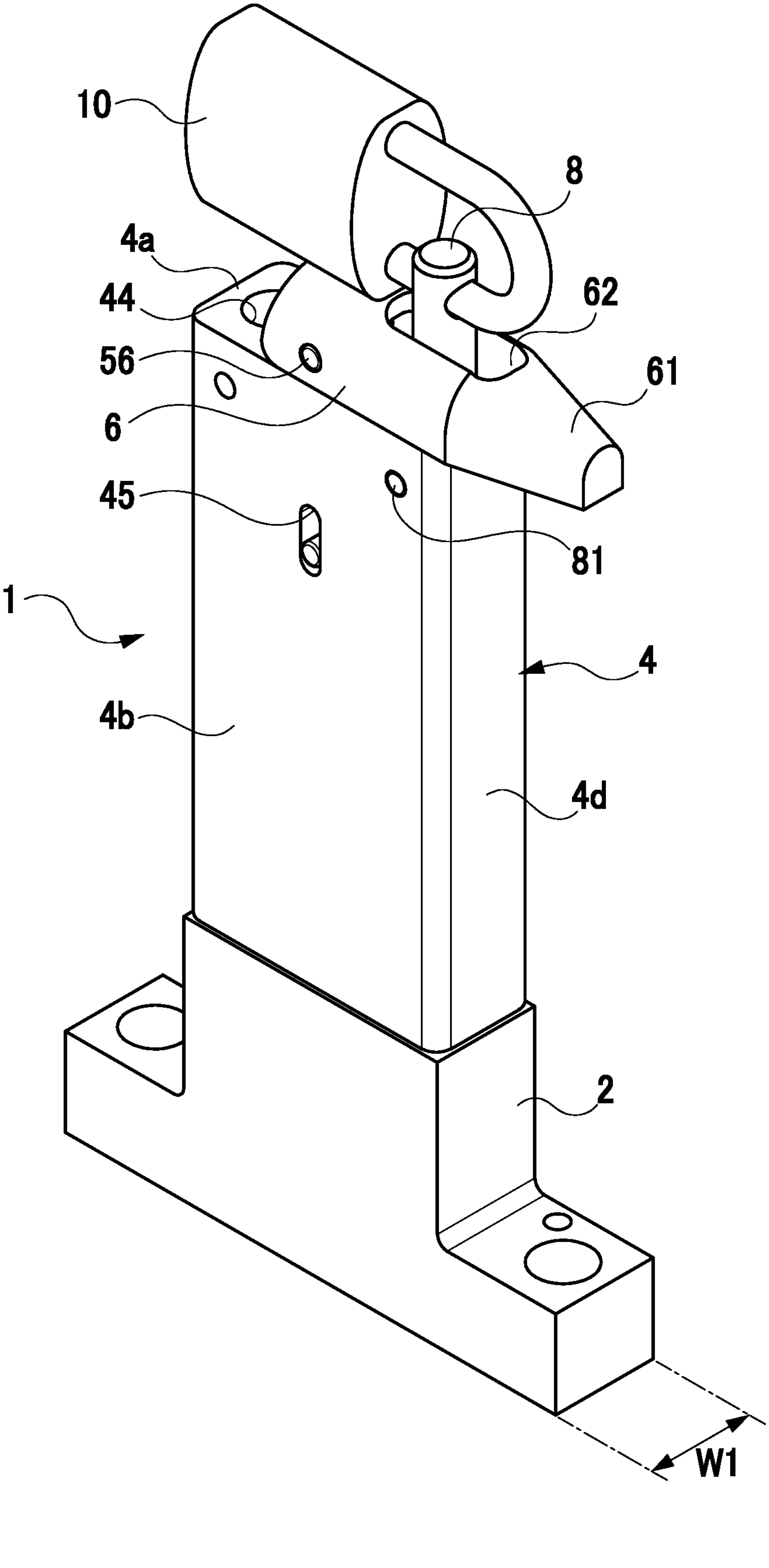
FIG. 1 is a perspective appearance view of a toggle-type manual valve in a first embodiment, attached with a padlock.

A detailed description of an embodiment of a toggle-type manual valve disclosed in this description will now be given referring to the accompanying drawings. FIG. 1 is a perspective appearance view of a toggle-type manual valve 1 attached with a padlock 10.

As shown in FIG. 1, the toggle-type manual valve 1 is to be incorporated, for example, in a gas supply unit for selectively supplying several gases to a reaction vessel. For reducing the size of a gas supply unit, the toggle-type manual valve 1 in the embodiment is designed with a thin rectangular parallelepiped shape with a width W1 of 10 mm, and is combined with another into a unit so that respective wide surfaces are in contact with each other.

The toggle-type manual valve 1 includes a valve section 2 for flowing a fluid and a case 4 attached thereto. On a surface (hereinafter, referred to as an upper surface) 4*a* of the case 4, located on the side opposite the valve section 2, a manual lever 6 is provided to control opening and closing of the valve section 2. The manual lever 6 is formed with an insertion hole 62. A lock rod member 8 is provided standing on the upper surface 4*a* of the case 4 and is inserted through the insertion hole 62 of the manual lever 6. When a padlock 10 is attached to the distal end of the lock rod member 8 protruding from the insertion hole 62, the operation of the manual lever 6 is restricted.

Figure 2:
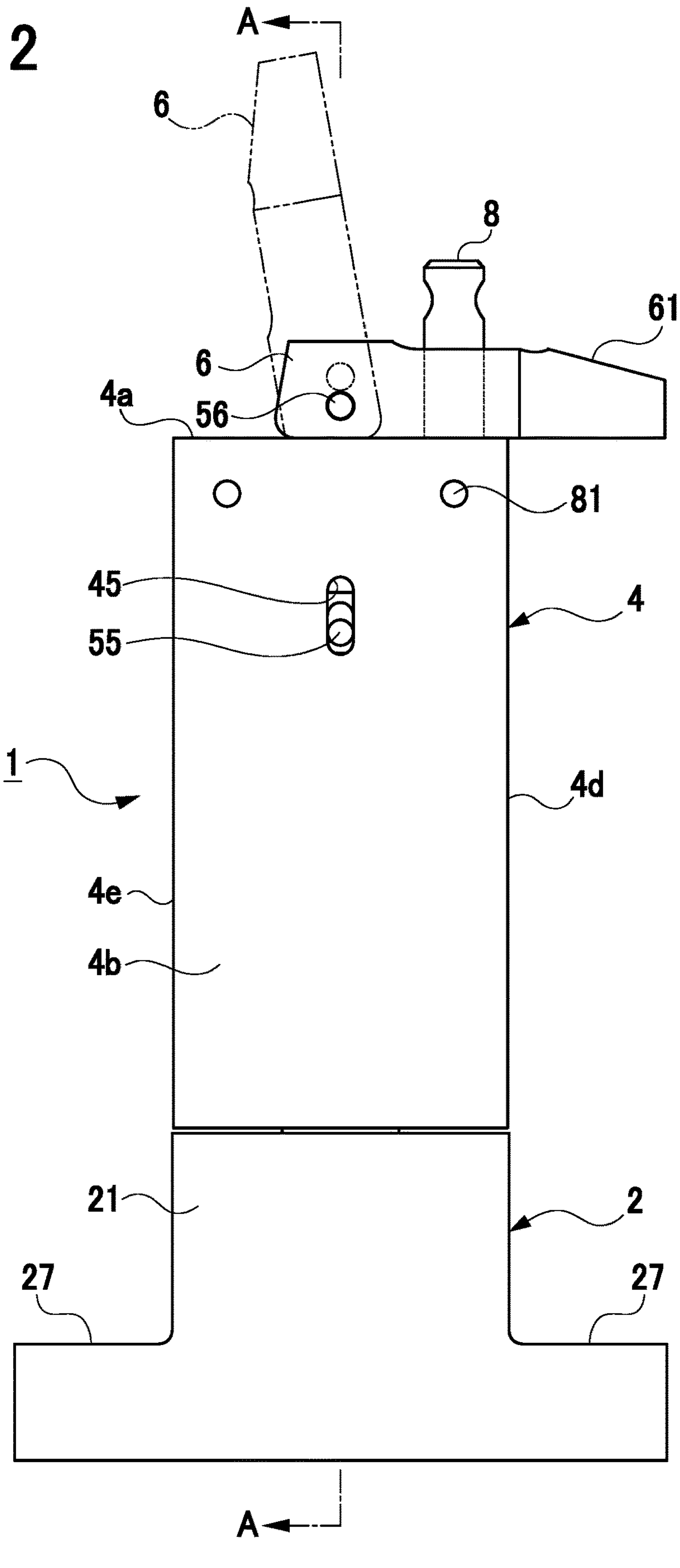
FIG. 2 is a front view of the toggle-type manual valve.

FIG. 2 is a front view of the toggle-type manual valve 1. The manual lever 6 is arranged to pivot between a horizontal position, as indicated with a solid line in FIG. 2, to which the manual lever 6 is pivoted to a horizontal direction to close the valve section 2, and a standing position as indicated with a two-dot dashed line in FIG. 2, to which the manual lever 6 is pivoted to a standing direction to open the valve section 2.

Figure 3:
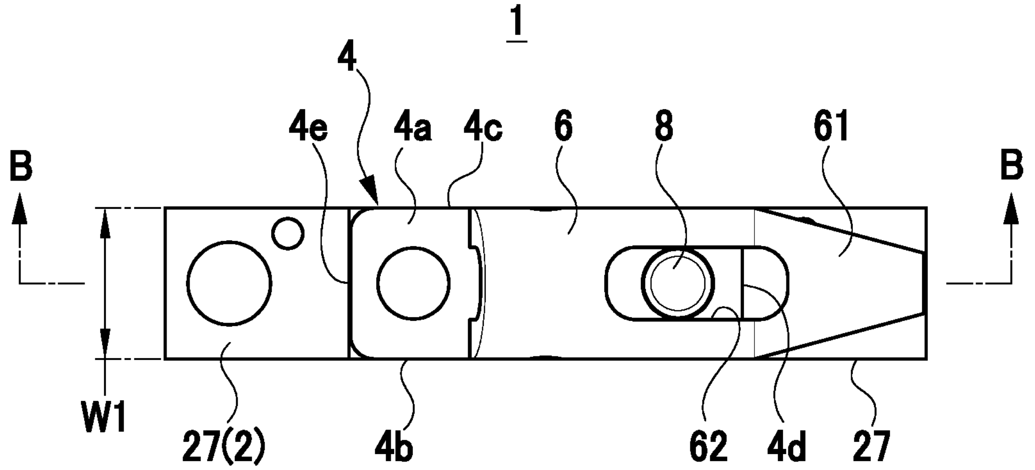
FIG. 3 is a top view of the toggle-type manual valve.

FIG. 3 is a top view of the toggle-type manual valve 1. The manual lever 6 is provided with a width of 10 mm or less so as not to project outward from a pair of wide surfaces 4*b* and 4*c* of the case 4. The manual lever 6 is formed with the insertion hole 62 through which the lock rod member 8 is inserted. The insertion hole 62 is formed as a slot to allow the manual lever 6 to turn between the horizontal position and the standing position even when the lock rod member 8 is provided standing on the upper surface 4*a* of the case 4.

As indicated with the solid line in FIG. 2, the manual lever 6 includes a distal end portion 61 that protrudes sideways from the side surface 4*d* located between the paired wide surfaces 4*b* and 4*c* of the case 4. The manual lever 6 is thus easily pushed up with a finger from below its distal end portion 61. The distal end portion 61 is tapered.

Figure 4:
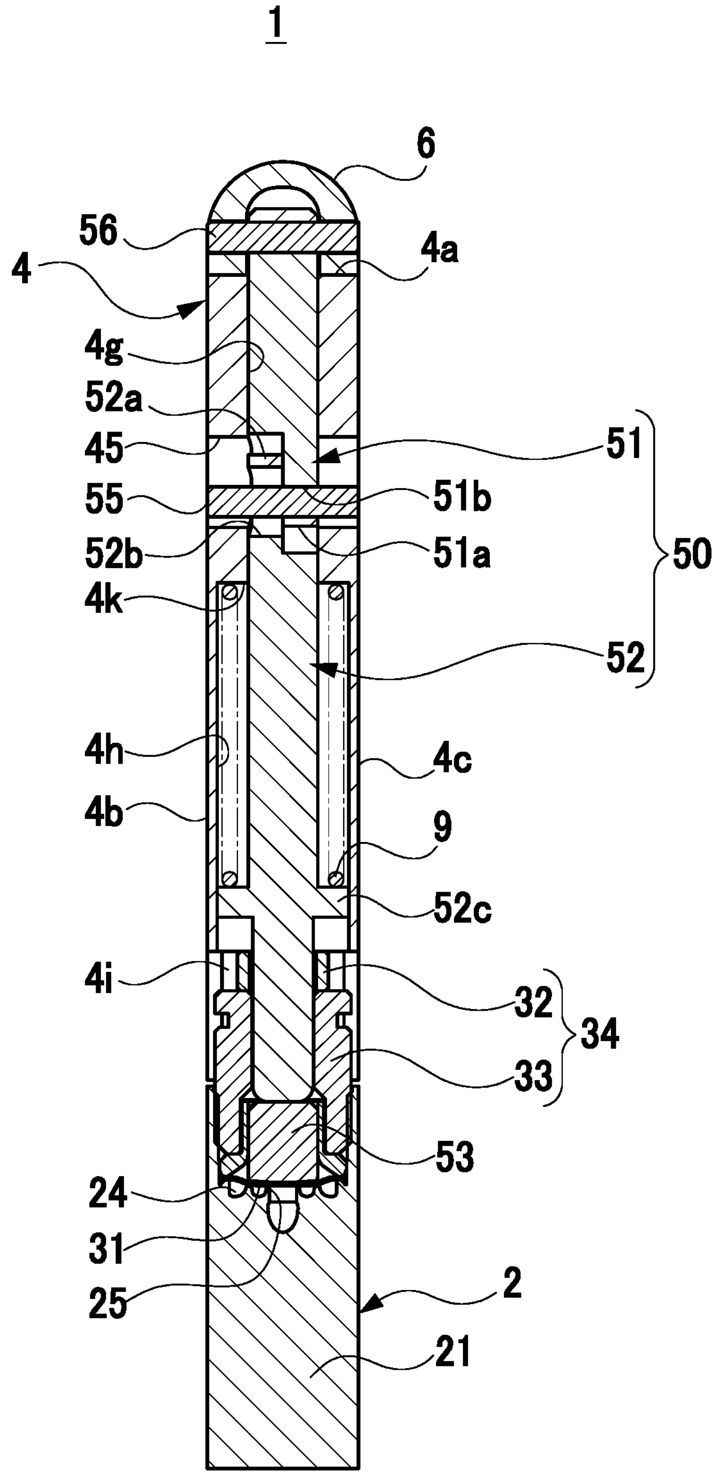
FIG. 4 is a cross-sectional view taken along an A-A line in FIG. 2.
Figure 5:
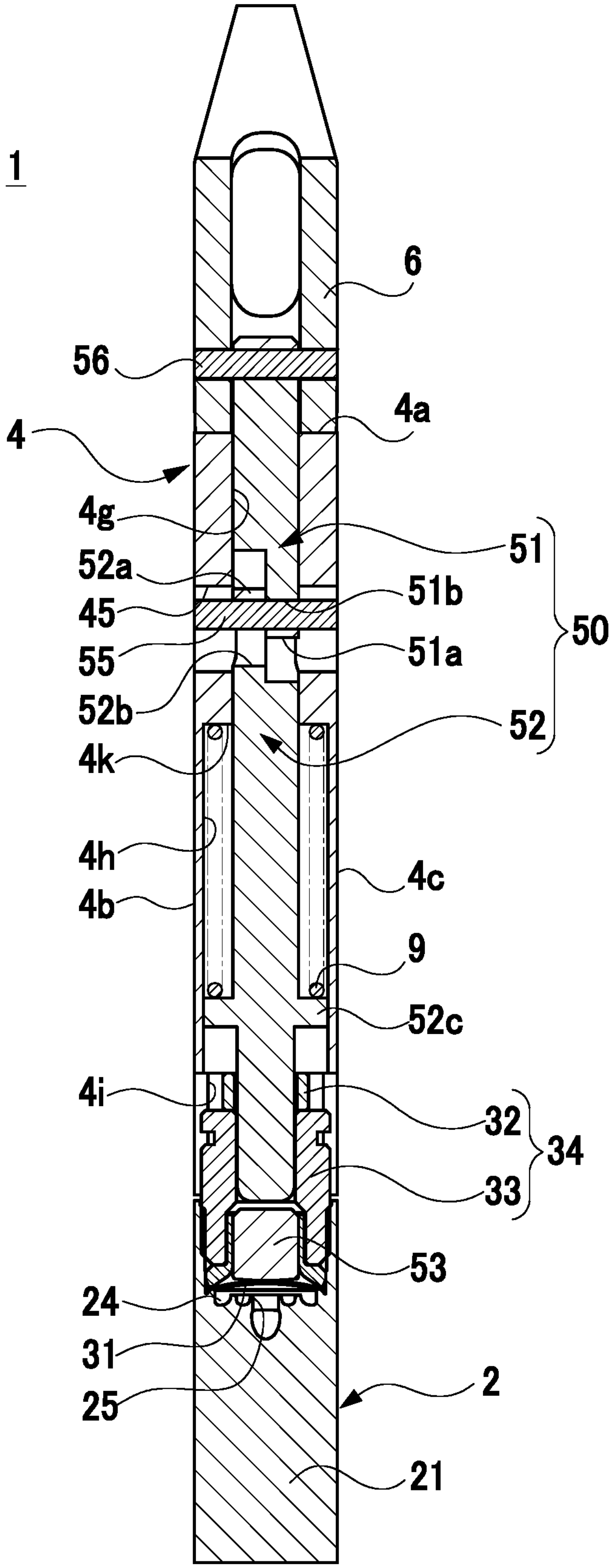
FIG. 5 is a cross-sectional view, corresponding to FIG. 4, showing a valve open state.
Figure 6:
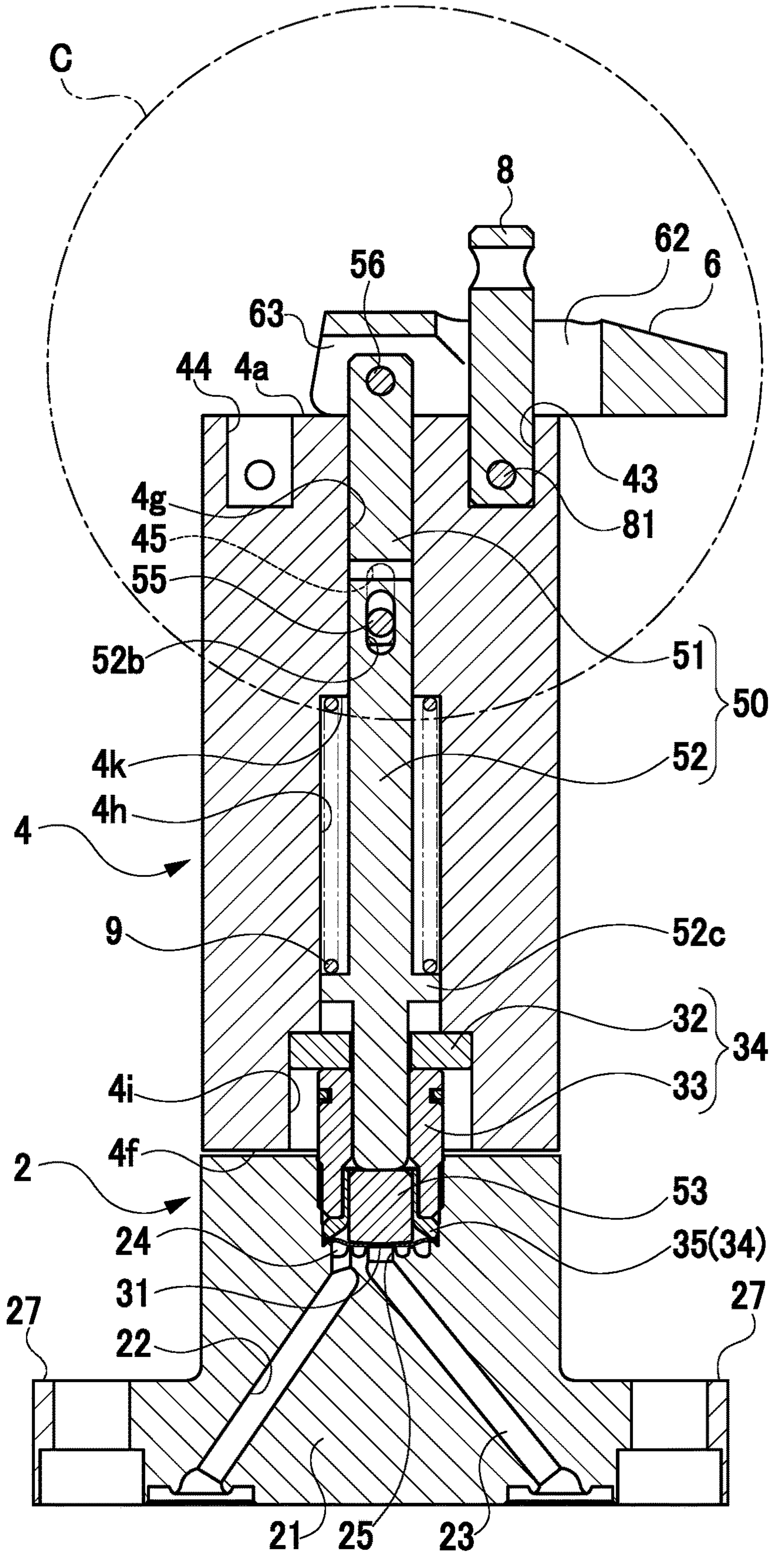
FIG. 6 is a cross-sectional view taken along a line B-B in FIG. 3.
Figure 7:
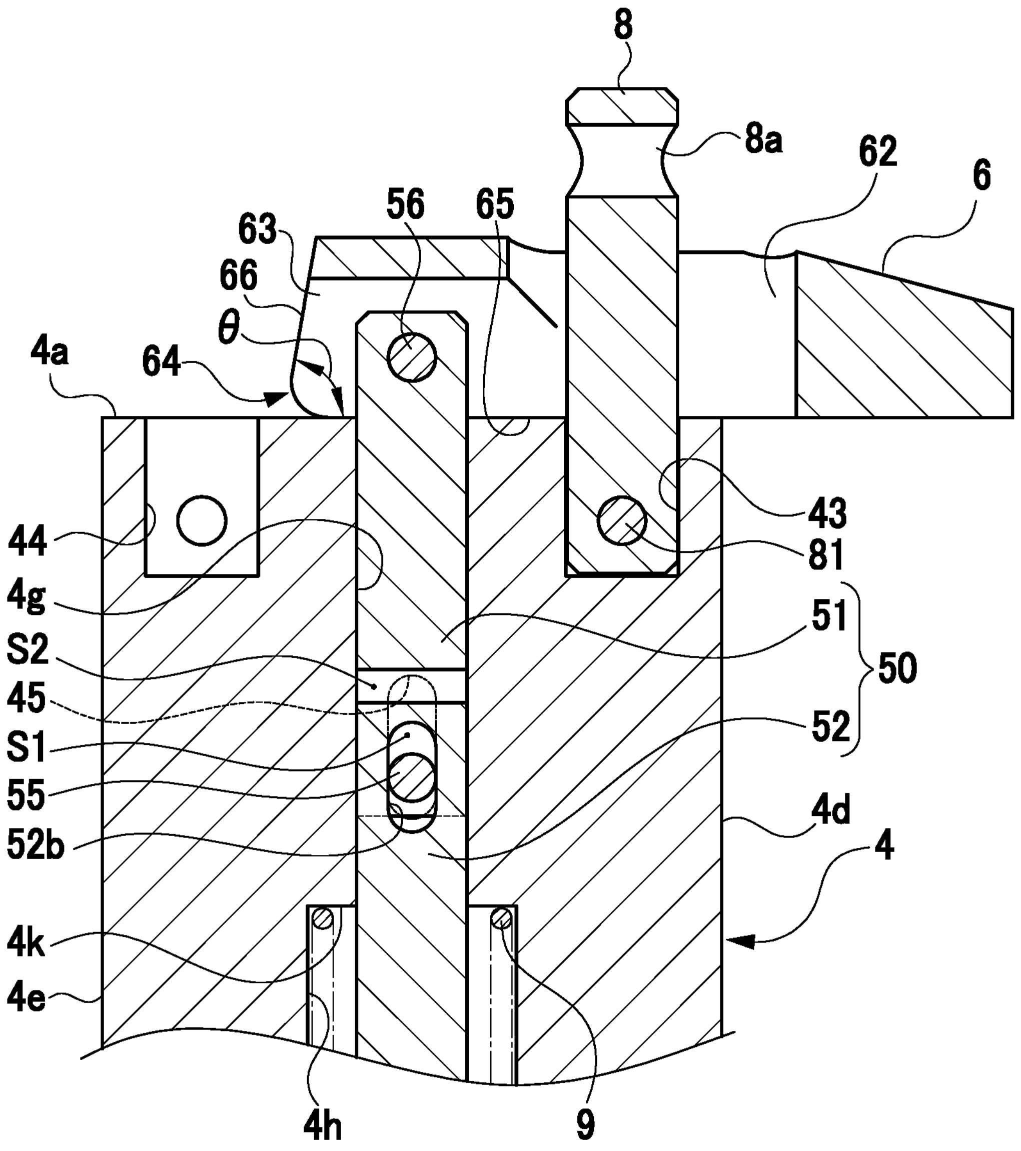
FIG. 7 is an enlarged view of an area C in FIG. 6.
Figure 8:
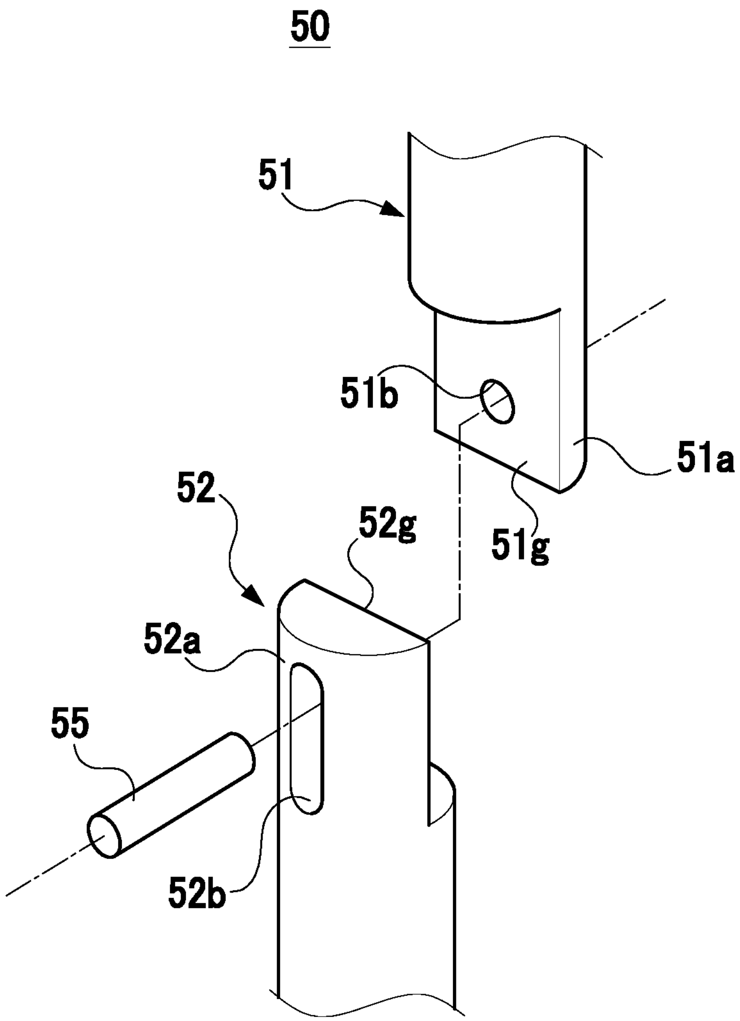
FIG. 8 is an explanatory diagram for a connecting structure of a first rod part and a second rod part.
Figure 9:
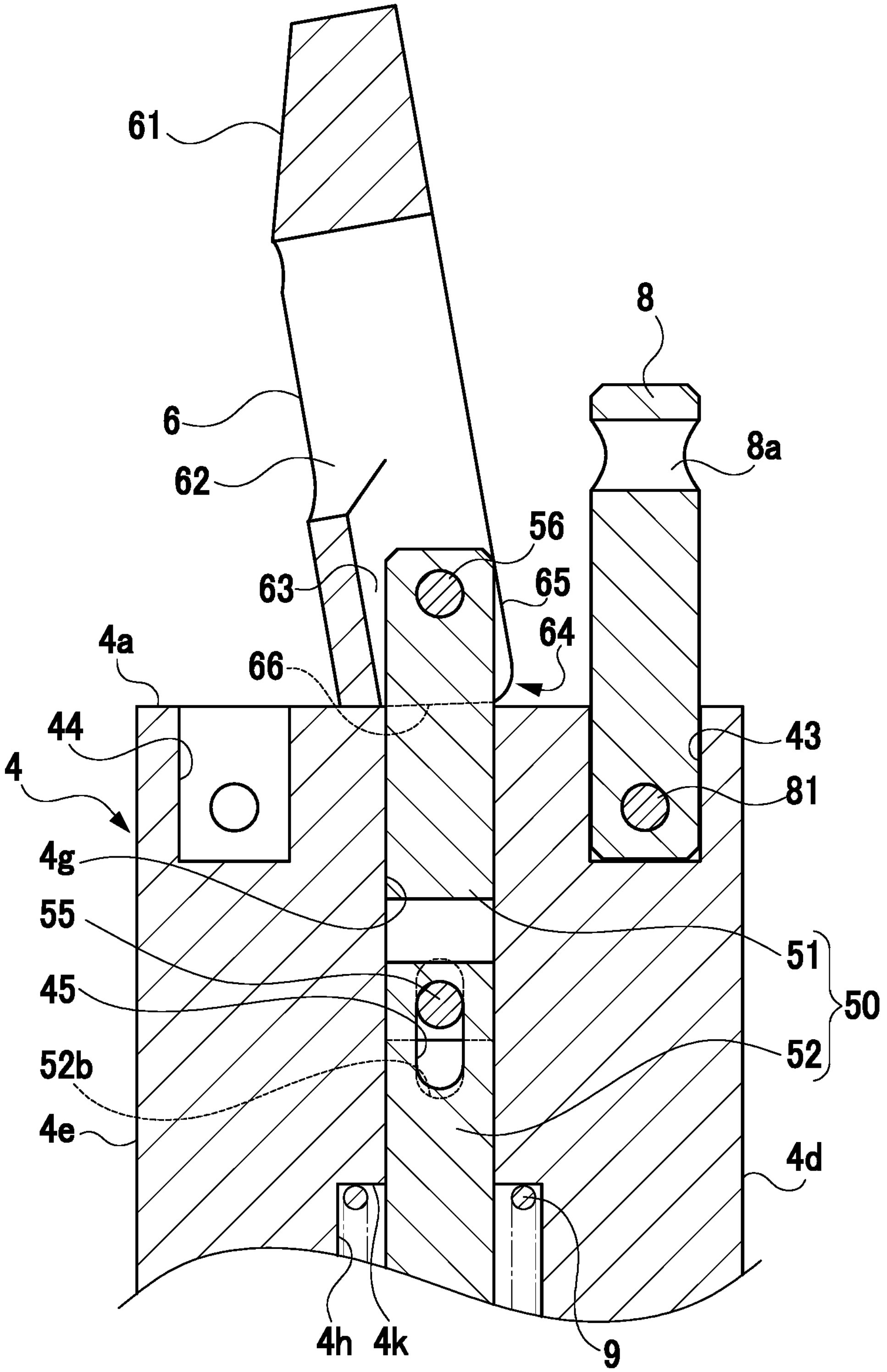
FIG. 9 is an enlarged cross-sectional view, corresponding to FIG. 7, showing a valve open state.
Figure 10:
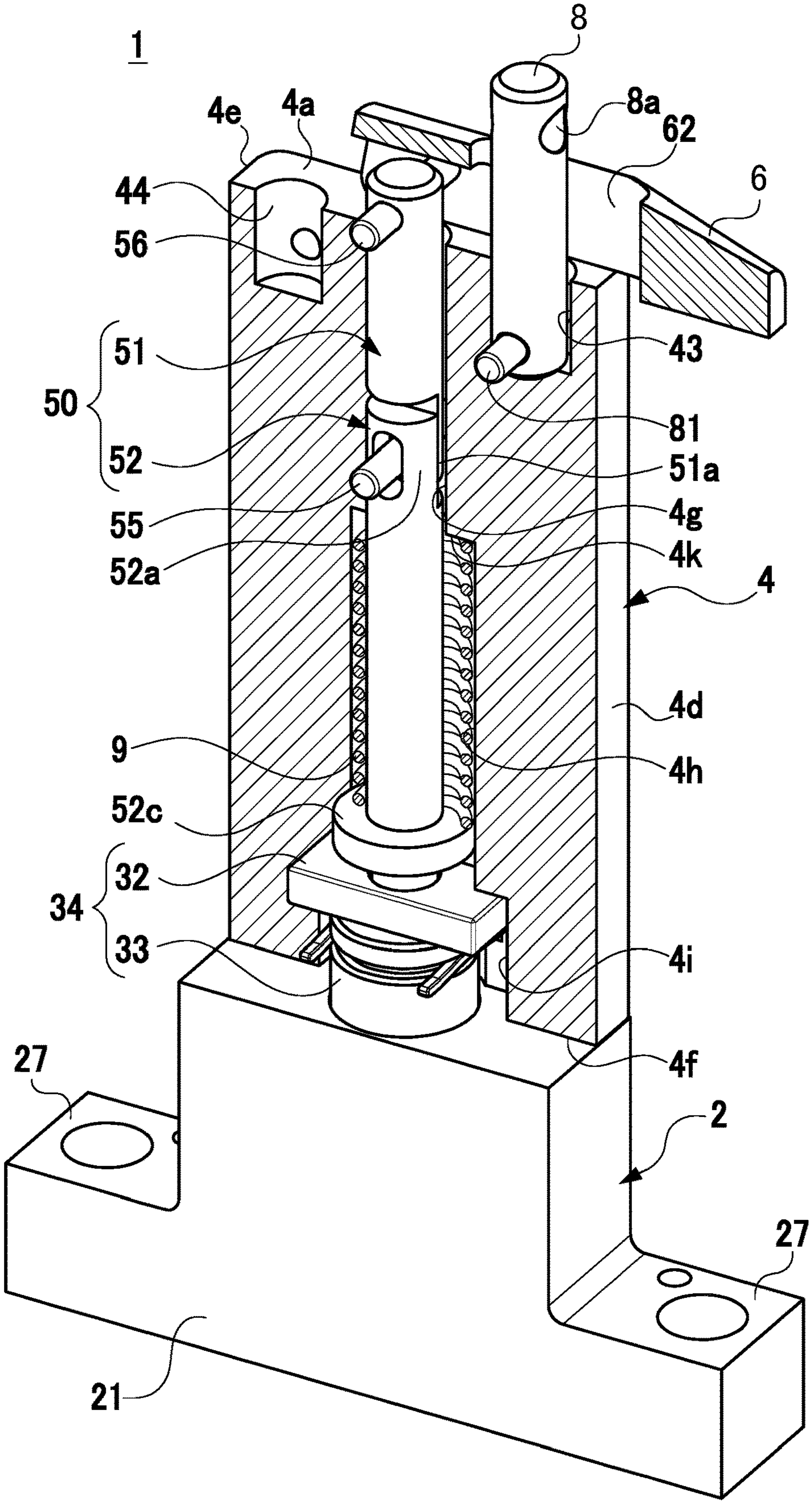
FIG. 10 is a partial cross-sectional view of a toggle-type manual valve during valve closing.

FIG. 4 is a cross-sectional view taken along a line A-A in FIG. 2. FIG. 5 is a view corresponding to FIG. 4, showing a valve open state. FIG. 6 is a cross-sectional view taken along a line B-B in FIG. 3. FIG. 7 is an enlarged view of the area C in FIG. 6. FIG. 8 is an explanatory view for the structure of connecting a first rod part 51 and a second rod part 52. FIG. 9 is an enlarged cross-sectional view corresponding to FIG. 7, showing a valve open state. FIG. 10 is a partial cross-sectional view of a toggle-type manual valve 1 during valve closing.

As shown in FIGS. 4, 5, 6, and 10, the case 4 is formed with a first hollow cavity portion 4*g*, a second hollow cavity portion 4*h*, and third hollow cavity portion 4*i*, which are arranged coaxially. As shown in FIG. 10, the first hollow cavity portion 4*g* and the second hollow cavity portion 4*h* each have a circular cross-sectional shape. The second hollow cavity portion 4*h* is provided larger in diameter than the first hollow cavity portion 4*g*, and a shoulder portion 4*k* is provided between the first hollow cavity portion 4*g* and the second hollow cavity portion 4*h*. The third hollow cavity portion 4*i* is provided in a rectangular parallelepiped shape and opens at a lower surface 4*f* of the case 4. A diaphragm retainer 34 is housed in the third hollow cavity portion 4*i*.

As shown in FIGS. 4, 5, and 10, a valve stem 50 extends through the first hollow cavity portion 4*g*, the second hollow cavity portion 4*h*, and third hollow cavity portion 4*i*. The end portion (upper portion in the figure) of the valve stem 50, located on the side opposite the valve section 2, protrudes above the first hollow cavity portion 4*g*. To this protruding portion of the valve stem 50, the manual lever 6 is pivotally connected via a camshaft 56. The valve stem 50 is provided with a flange 52*c* as a portion located in the second hollow cavity portion 4*h*. A spring 9 is provided in a compressed state between the shoulder portion 4*k*, which is provided between the first hollow cavity portion 4*g* and the second hollow cavity portion 4*h*, and the flange 52*c* of the valve stem 50 to constantly apply the force in the direction toward the valve section, namely, in the valve-section direction (downward in the figure) to the valve stem 50. The spring 9 is one example of the urging member. As shown in FIG. 6, the valve stem 50 has a lower end portion protruding toward the valve section 2 and transmits the urging force of the spring 9 to a diaphragm 31 via a pressure member 53.

As shown in FIG. 6, the valve section 2 is provided with a flow channel block 21 formed with a first flow channel 22 and a second flow channel 23. The flow channel block 21 is provided with a valve chamber 24 hermetically partitioned by the diaphragm 31. The first flow channel 22 and the second flow channel 23 are in communication with each other via the valve chamber 24. The valve chamber 24 is provided with a valve seat 25 along the outer circumference of the opening of the second flow channel 23 that opens in the valve chamber 24. The valve section 2 controls the distribution of a fluid by bringing the diaphragm 31 into contact with or away from the valve seat 25. A first holding member 33 is screwed in the flow channel block 21, pressing the second holding member 35 against the outer edge of the diaphragm 31, so that the diaphragm 31 is hermetically attached to the flow channel block 21. In the second holding member 35, the pressure member 53 having a columnar shape is housed slidably. The first holding member 33 is limited from rotating and prevented from loosening by a rectangular locking member 32 mounted in the third hollow cavity portion 4*i*. The diaphragm retainer 34 consists of the first holding member 33, the second holding member 35, and the locking member 32.

The valve stem 50 is divided into the first rod part 51 and the second rod part 52. The first rod part 51 and the second rod part 52 are round rods each having a circular cross-section and have the same thickness. The first rod part 51 is slidably inserted through the first hollow cavity portion 4*g* and can stably move in the axial direction. The second rod part 52 is provided with the flange 52*c*. The second rod part 52 has an upper end portion slidably supported in the first hollow cavity portion 4*g*, the flange 52*c* slidably loaded in the second hollow cavity portion 4*h*, and further a lower end portion slidably held by the first holding member 33, so that the second rod part 52 can stably move in the axial direction.

As shown in FIGS. 7 and 8, the first rod part 51 is provided, at an end portion (a lower end portion in the figure, one example of the first end portion) located on the side close to the second rod part 52, that is, on the side toward the valve section 2, with a first protruding portion 51*a* having a semicircular cross-section and protruding in the axial direction. The second rod part 52 is provided, at an end portion (an upper end portion in the figure, one example of the second end portion) located on the side close to the first rod part 51, that is, on the side opposite the valve section 2, with a second protruding portion 52*a* having a semicircular cross-section and protruding in the axial direction.

The first rod part 51 and the second rod part 52 are formed with irregular end portions to be engaged with each other. The valve stem 50 is arranged such that the first rod part 51 and the second rod part 52 are placed coaxially by recess/protrusion engagement in which a flat surface 51*g* of the diametrical portion of the first protruding portion 51*a* and a flat surface 52*g* of the diametrical portion of the second protruding portion 52*a* face each other within the region of the first hollow cavity portion 4*g*.

As shown in FIGS. 4 and 5, the first protruding portion 51*a* is formed with a fitting hole 51*b* in which a connecting pin 55 is fitted. The second protruding portion 52*a* is formed with an elongated hole 52*b* extending long in the axial direction of the second rod part 52. It also may be arranged such that the connecting pin 55 is fixed to the second protruding portion 52*a* and the first protruding portion 51*a* is formed with an elongated hole. The connecting pin 55 is one example of the pin fixed to one of the first rod part 51 and the second rod part 52. The elongated hole 52*b* is one example of the elongated hole formed in the other of the first rod part 51 and the second rod part 52.

The case 4 is provided with a guide hole 45 extends through between the pair of wide surfaces 4*b* and 4*c*. The guide hole 45 is formed long in the moving direction of the valve stem 50 (the vertical direction in the figure). The connecting pin 55 protrudes out from both open ends of the fitting hole 51*b*. One end of the connecting pin 55 passes through the elongated hole 52*b* of the second rod part 52 and held to be slidable within the guide hole 45. The other end of the connecting pin 55 is held slidable within the guide hole 45. Accordingly, the first rod part 51 and the second rod part 52 can linearly reciprocate in the vertical direction in the figure while being guided in the axial direction via the connecting pin 55.

As shown in FIG. 7, when the manual lever 6 is in the horizontal position, the connecting pin 55 is placed near the center of the elongated hole 52*b*. Thus, a gap S1 is formed between the connecting pin 55 and the upper internal surface of the elongated hole 52*b* (the internal surface of the elongated hole 52*b* located on the side opposite the valve section 2). Further, a gap S2 is formed between the distal end face of the second protruding portion 52*a* and the first rod part 51. Therefore, even when the force in the counterclockwise direction in the figure acts on the manual lever 6 in the horizontal position, the first rod part 51 does not transmit the rotational force of the manual lever 6 to the second rod part 52 until the connecting pin 55 moves in the gap S1 and abuts on the upper internal surface of the elongated hole 52*b*. Further, even the force downward in the figure (in the valve-section direction) acts on the manual lever 6 in the standing position, the first rod part 51 does not transmit the downward force in the figure to the second rod part 52 until the first rod part 51 moves down by the gap S2 and abuts on the second rod part 52. In this way, the valve stem 50, which is divided into the first rod part 51 and the second rod part 52, is provided with an allowance to prevent the valve section 2 from opening and closing following the manual lever 6 at the start of operation of the manual lever 6. The gap S1 is one example of the first gap. The gap S2 is one example of the second gap.

As shown in FIGS. 7 and 9, the manual lever 6 is provided with a cam mechanism 64 to move the valve stem 50 upward and downward in the figure. Specifically, the manual lever 6 is provided with a housing space 63 in which the upper end portion of the valve stem 50 is placed. The camshaft 56 inserted across the first rod part 51 is provided in the manual lever 6 to extend across the housing space 63.

The manual lever 6 is provided with a first cam face 65 and a second cam face 66. The second cam face 66 is one example of the stopper part. The camshaft 56 is placed at a position so that the distance to the second cam face 66 is longer than the distance to the first cam face 65. Thus, when the manual lever 6 is turned from the horizontal position where the first cam face 65 contacts the upper surface 4*a* in FIG. 7 to the standing position where the second cam face 66 contacts the upper surface 4*a* in FIG. 9, the manual lever 6 can lift up the valve stem 50 against the urging force of the spring 9.

As shown in FIG. 7, the angle θ formed by the first cam face 65 and the second cam face 66 is smaller than 90°. More preferably, the angle θ is set within a range from 75° to 85°. If the angle θ is smaller than 75°, the manual lever 6 tilts excessively for valve opening, leading to poor operability for valve closing. If the angle θ exceeds 85°, the manual lever 6 is oriented at almost right angle to the upper surface 4*a*. This makes it difficult to operate the manual lever 6 for valve closing when the toggle-type manual valves 1 are contiguously placed in a row. As the manual lever 6 is turned to a position where the second cam face 66 contacts the upper surface 4*a* as shown in FIG. 9, the distal end portion 61 can move to a position beyond the upper end portion of the valve stem 50.

As shown in FIG. 10, in the toggle-type manual valve 1, a first mounting hole 43 and a second mounting hole 44 are formed in a columnar shape that opens in the upper surface 4*a* of the case 4. These first mounting hole 43 and second mounting hole 44 are holes for mounting the lock rod member 8. The first mounting hole 43 and the second mounting hole 44 are arranged at symmetrical positions across the valve stem 50 (the first rod part 51). The lock rod member 8 is fixed to the case 4 with a fixed pin 81 extending through the case 4 and the lock rod member 8, for example, when fitted in the first mounting hole 43. This method for fixing the lock rod member 8 is not limited to the use of the fixed pin 81, but may adopt press-fitting, gluing, welding, and others.

The first rod part 51 connected to the manual lever 6 is constituted of a round rod having a circular cross-section. Therefore, the manual lever 6 tilted down toward the side surface 4*d* of the case 4 as illustrated with a solid line in the figure can be reattached to the first rod part 51 by removing the camshaft 56 and then reversing the orientation of the manual lever 6 to tilt down toward the opposite side (toward the side surface 4*e* of the case 4) to change the specification of the toggle-type manual valve 1. In this case, except for the manual lever 6, the arrangement of other parts of the toggle-type manual valve 1 remains unchanged.

Next, the operations of the above-described toggle-type manual valve 1 will be described. When the toggle-type manual valve 1 attached with the padlock 10 as shown in FIG. 1 is to be opened, the padlock 10 is removed from the lock rod member 8.

When the manual lever 6 in the horizontal position shown in FIG. 7 is turned in a counterclockwise direction in the figure, the manual lever 6 as turned pulls upward the valve stem 50 against the spring 9. The insertion hole 62 allows the manual lever 6 to be turned without interfering with the lock rod member 8. As the valve stem 50 no longer presses the diaphragm 31 via the pressure member 53, the diaphragm 31 is separated from the valve seat 25 by its own elastic force or the pressure of a fluid. Thus, the space between the first flow channel 22 and the second flow channel 23 is opened, allowing the fluid to flow therethrough.

As shown in FIG. 9, once the manual lever 6 turned to the position where the second cam face 66 contacts the upper surface 4*a* of the case 4, the manual lever 6 cannot be turned any further. In this case, the manual lever 6 is in the tilting posture with respect to the upper surface 4*a* of the case 4, with the distal end portion 61 turned beyond the first rod part 51, to maintain the valve open state. This posture of the manual lever 6 allows the operator to visually confirm that the toggle-type manual valve 1 is in the valve open state.

Further, for the toggle-type manual valve 1, for example, even if the operator's hand hits the manual lever 6 in the standing position, the second cam face 66 prevents further turning of the manual lever 6. Also, for example, even if the downward force in the figure acts on the manual lever 6 in the standing position, the manual lever 6 does not move because the second cam face 66 contacts the upper surface 4*a* of the case 4. Thus, even the external force acts on the manual lever 6 during valve opening, the valve stem 50 does not move and the valve opening state can be maintained.

When the toggle-type manual valve 1 is to be closed, the manual lever 6 is turned from the standing position shown in FIG. 9 in the clockwise direction in the figure, and the cam mechanism 64 pushes down the first rod part 51 toward the valve section 2. The first rod part 51 moves downward while moving the connecting pin 55 within the elongated hole 52*b*, reducing the force of pulling up the second rod part 52 via the connecting pin 55. In other words, the manual lever 6 lowers the force of pulling up the valve stem 50. As shown in FIG. 6, the second rod part 52 is urged by the spring 9 to move downward and press the diaphragm 31 against the valve seat 25 via the pressure member 53 to seal the valve seat 25. This closes the space between the first flow channel 22 and the second flow channel 23, blocking the fluid from flowing therethrough.

As shown in FIG. 7, in the toggle-type manual valve 1 in the valve closed state, the gap S2 is formed between the first rod part 51 and the second rod part 52. Further, the connecting pin 55 is located near the center of the elongated hole 52*b*. Thus, in the toggle-type manual valve 1, when the manual lever 6 is in the horizontal position, the second rod part 52 is not subjected to any external force except for the urging force of the spring 9 because of the gap S2. This can avoid the diaphragm 31 from excessively pressing against the valve seat 25 and causing resultant damage of the valve seat 25.

The distal end portion of the lock rod member 8 protruding from the manual lever 6 in the horizontal position is provided with a lock attachment hole 8*a*. This lock attachment hole 8*a* is one example of the attachment hole. As shown in FIG. 1, the padlock 10 is attached to the lock attachment hole 8*a* and locked. Thus, the manual lever 6 is restricted from counterclockwise turning by the padlock 10 attached to the lock attachment hole 8*a*, so that the toggle-type manual valve 1 can avoid the manual lever 6 from accidentally turning counterclockwise and opening the valve.

Meanwhile, in the toggle-type manual valve 1 in the embodiment, the valve stem 50 connected to the manual lever 6 is divided into the first rod part 51 and the second rod part 52 as shown in FIG. 7. The connecting pin 55 fitted to the first rod part 51 is slidably inserted in the elongated hole 52*b* of the second rod part 52, and the gap S1 is formed between the connecting pin 55 and the upper internal surface of the elongated hole 52*b*. For example, after the manual lever 6 of the toggle-type manual valve 1 is turned to the horizontal position to close the valve section 2, the manual lever 6 may be subjected to the force in the standing direction. In this case, the first rod part 51 connected to the manual lever 6 via the camshaft 56 is moved upward in association with the turning of the manual lever 6. However, the second rod part 52 does not move until the connecting pin 55 contacts the upper internal surface of the elongated hole 52*b*. Thus, even if the external force acts on the manual lever 6 in the horizontal position, the toggle-type manual valve 1 can maintain the valve closed state, thereby preventing leakage of a fluid, which is not intended by an operator.

Figure 11:
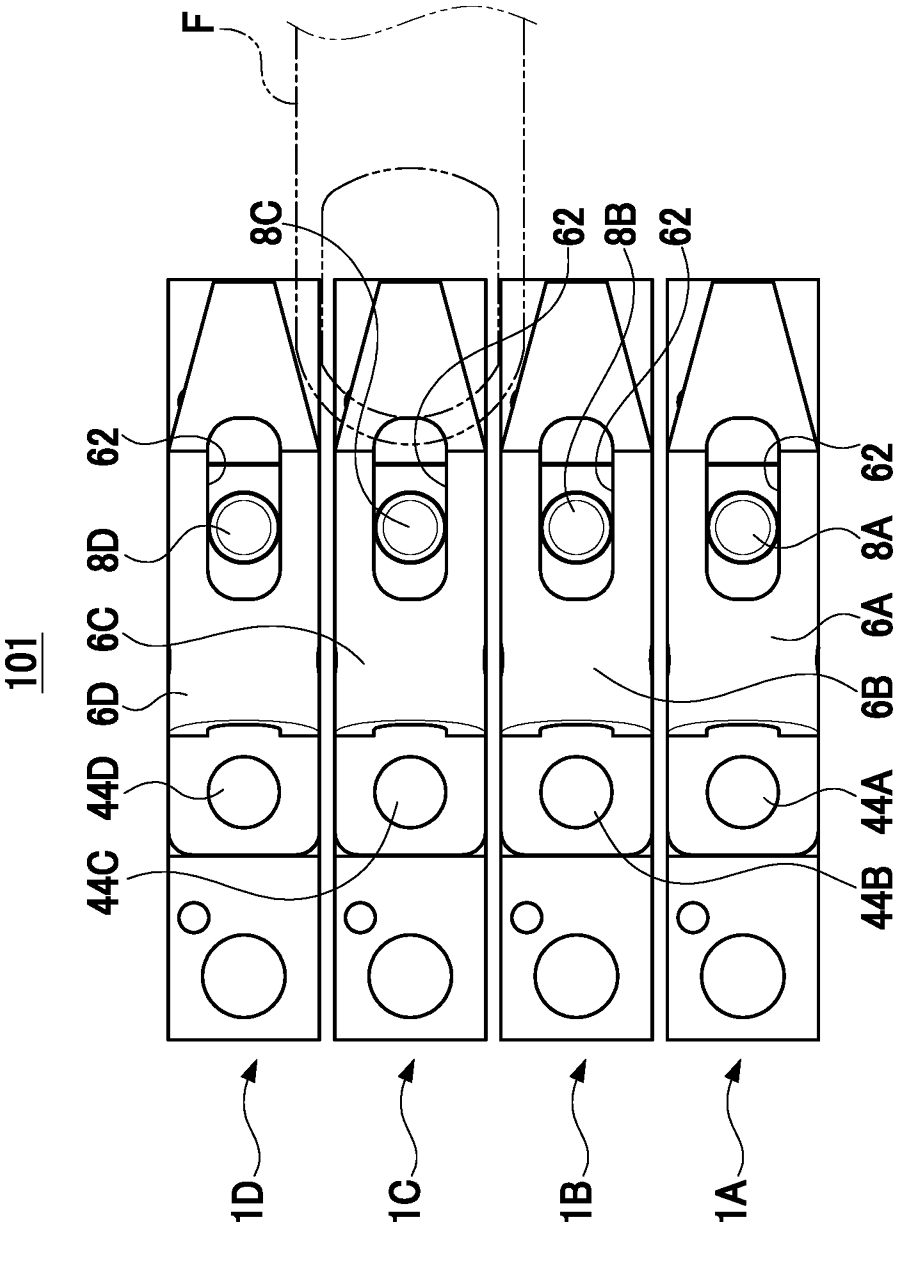
FIG. 11 is a top view of a 4-section valve unit.

The above-described toggle-type manual valve 1 can compose a compact valve unit by securing a mounting part 27 of the flow channel block 21 to a base plate not shown so that the paired wide surfaces of one valve 1 are in contact with wide surfaces of adjacent valves 1 respectively. For example, as shown in FIG. 11, a valve unit 101 is assumed to be assembled by contiguously arranging first to fourth toggle-type manual valves 1A, 1B, 1C, and 1D so that respective manual levers 6A, 6B, 6C, and 6D are tilted down in the same one direction to the horizontal position. The first to fourth toggle-type manual valves 1A, 1B, 1C, and 1D each have a thin profile having a width W1 of 10 mm, and also respective manual levers 6A, 6B, 6C, and 6D each have a width of 10 mm. Generally, in most cases, the width of the finger F of an operator is 10 mm or more. Therefore, when the operator attempts to move the manual lever 6C of the third toggle-type manual valve 1C from the horizontal position to the standing position by placing his/her finger F on the manual lever 6C from below, the finger F may hit the adjacent manual lever 6B or 6D, accidentally turning it together from the horizontal position to the standing position.

Figure 12:
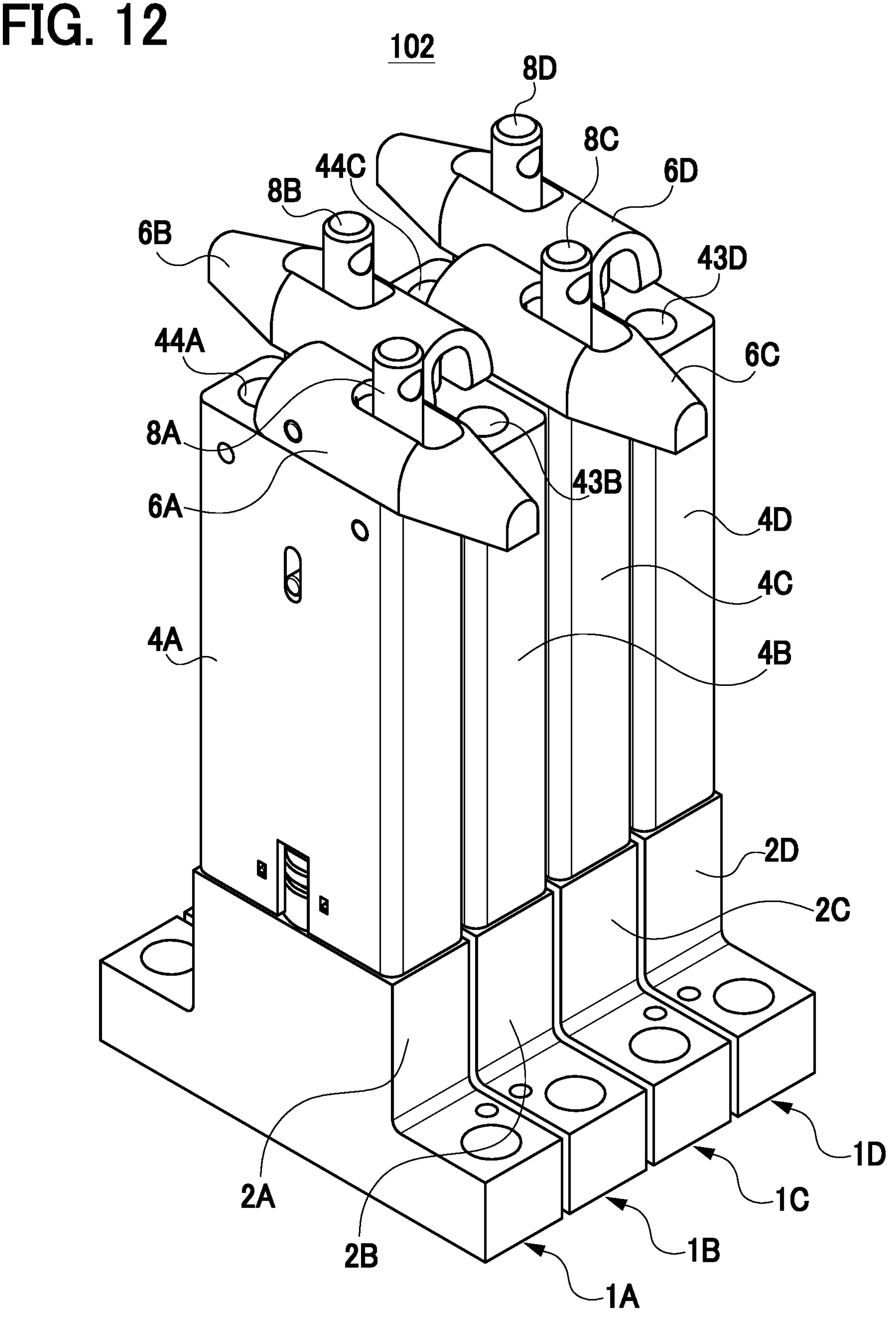
FIG. 12 is a perspective external view of the 4-section valve unit.

In the present embodiment, therefore, a valve unit 102 is composed of the first to fourth toggle-type manual valves 1A, 1B, 1C, and 1D provided contiguously so that respective manual levers 6A, 6B, 6C, and 6D in the horizontal position are oriented with respective distal end portions alternately in opposite directions, as shown in FIG. 12.

Figure 13:
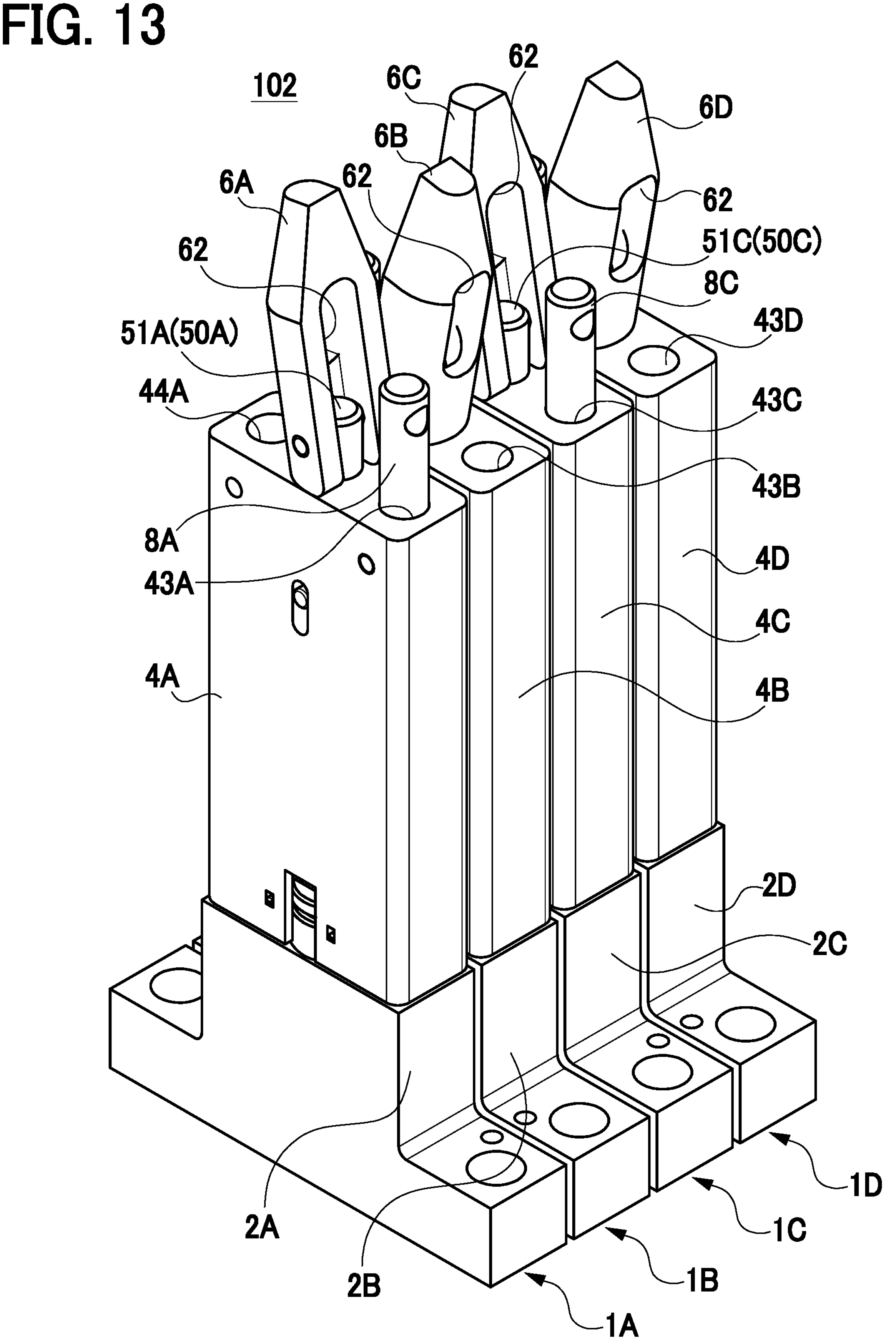
FIG. 13 is a perspective external view of the 4-section valve unit.

Specifically, as shown in FIG. 13, for the first toggle-type manual valve 1A and the third toggle-type manual valve 1C, the lock rod members 8A and 8C are attached respectively to the first mounting holes 43A and 43C, and the manual levers 6A and 6C are connected respectively to the first rod part 51A of the valve stem 50A and the first rod part 51C of the valve stem 50C and turned to tilt down toward the first mounting holes 43A and 43C to the horizontal position. For the second toggle-type manual valve 1B and the fourth toggle-type manual valve 1D, the lock rod members 8B and 8D are attached respectively to the second mounting holes 44B and 44D, and the manual levers 6B and 6D are connected respectively to the first rod part 51B of the valve stem 50B and the first rod part 51D of the valve stem 50D and turned to tilt down toward the second mounting holes 44B and 44D to the horizontal position.

The first to fourth toggle-type manual valves 1A, 1B, 1C, and 1D have identical configurations except that respective manual levers 6A, 6B, 6C and 6D are oriented reversely. In other words, the valve unit 102 shown in FIGS. 12 and 13 has identical flow channels to those of the valve unit 101 shown in FIG. 11. Consequently, since only the orientations of the manual levers 6A, 6B, 6C and 6D can be changed according to the operation, the first to fourth toggle-type manual valves 1A, 1B, 1C, and 1D are easy to use.

Figure 14:
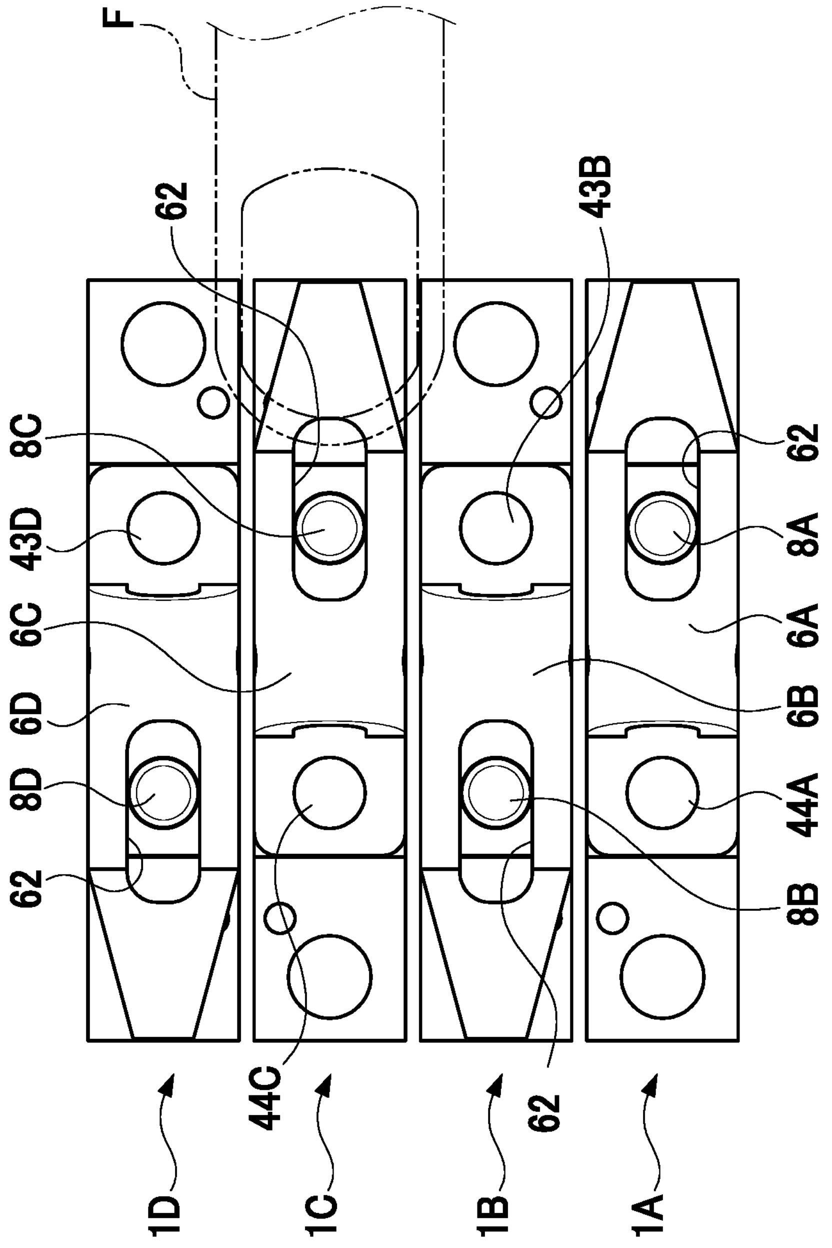
FIG. 14 is a top view of FIG. 12.

For the valve unit 102 configured as above, as shown in FIG. 14, assuming that an operator attempts to move the manual lever 6C of the third toggle-type manual valve 1C from the horizontal position to the standing position by placing his/her finger F on the manual lever 6C from below. At this time, the adjacent manual levers 6B and 6D are tilted down in the opposite orientations. This makes it possible for the operator to operate only the manual lever 6C by putting his/her finger F on the manual lever 6C without touching or hitting the adjacent manual levers 6B and 6D.

Further, it is assumed that all the first to fourth toggle-type manual valves 1A, 1B, 1C, and 1D are in the valve open state as shown in FIG. 13. In this case, the manual levers 6A, 6B, 6C and 6D stand in the tilting posture on the upper surfaces 4*a* of the corresponding cases 4 by respectively turning beyond the valve stems 50A, 50B, 50C, and 50D. These manual levers 6A, 6B, 6C and 6D in the standing position are thus placed with respective distal end portions displaced alternately. These manual levers 6A, 6B, 6C and 6D in the standing position are restricted from further turning in the standing direction by the respective second cam faces 66 contacting the upper surfaces 4*a* of the corresponding cases 4. Therefore, for example, when the manual lever 6C of the third toggle-type manual valve 1C is to be tilted toward the first mounting hole 43C to close the valve 1C, if the finger F hits the adjacent standing manual lever 6B and 6D, the manual levers 6B and 6D are restricted from turning and thus only the manual lever 6C is operated to close the third toggle-type manual valve 1C.

Figure 15:
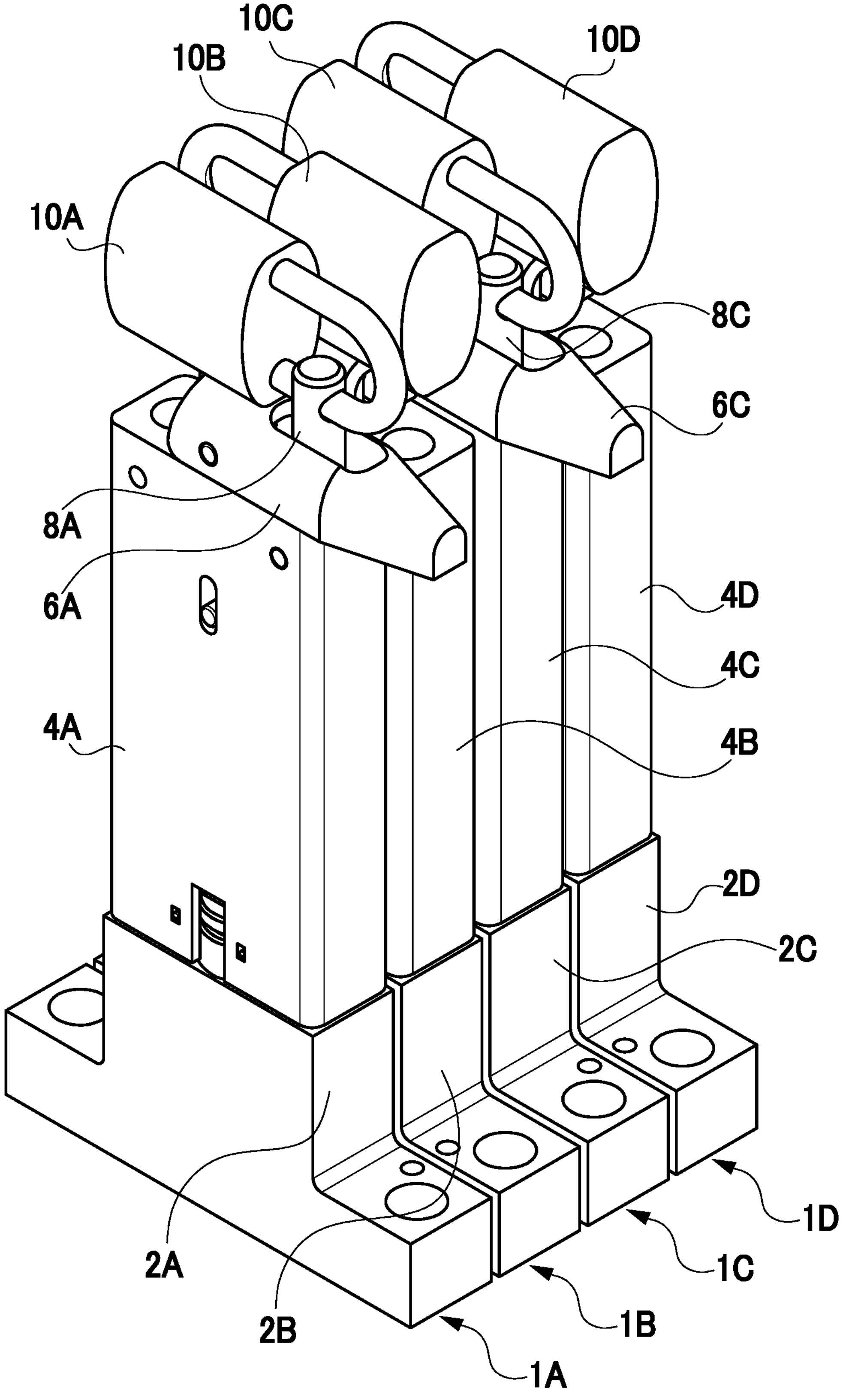
FIG. 15 is a perspective external view of the 4-section valve unit with a padlock attached.

Furthermore, as shown in FIG. 15, when the manual levers 6A, 6B, 6C and 6D of the first to fourth toggle-type manual valves 1A, 1B, 1C, and 1D are to be locked respectively with the padlocks 10A, 10B, 10C, and 10D, these padlocks 10A, 10B, 10C, and 10D are placed sideways on the corresponding manual levers 6A, 6B, 6C and 6D. The U-shaped locking bars of the padlocks 10A, 10B, 10C, and 10D are alternately oriented in opposite directions, allowing an operator to easily lock or unlock the padlock 10A, 10B, 10C, or 10D for example by hooking and pulling the locking bar to be unlocked with his/her finger F or pushing the locking bar to be locked into the padlock.

The toggle-type manual valve 1 in the embodiment, as described above, the first rod part 51 connected to the manual lever 6 is permitted to move relative to the second rod part 52 in the range where the connecting pin 55 can move within the elongated hole 52*b*. Accordingly, even if for example the operator's hand hits the manual lever 6 during valve closing, applying the external force to the manual lever 6, only the first rod part 51 is allowed to move following the manual lever 6 but the second rod part 52 does not move. Therefore, the toggle-type manual valve 1 can suppress leakage unintended by the operator. Thus, the toggle-type manual valve 1 can suppress leakage unintended by the operator.

The valve unit 102 in the embodiment, when four toggle-type manual valves 1A, 1B, 1C, and 1D are provided contiguously, respective manual levers 6A, 6B, 6C, and 6D are oriented alternately in opposite directions. Accordingly, the interval between the manual levers 6A and 6C adjacently arranged and the interval between the manual levers 6B and 6D adjacently arranged are each wider than the interval between adjacent two of the manual levers 6A, 6B, 6C, and 6D oriented in the same direction as shown in FIG. 11. Thus, when one manual lever 6C is to be operated by an operator, the adjacent manual levers 6B and 6D are less likely to be accidentally moved together. Further, each of the toggle-type manual valves 1A, 1B, 1C, and 1D is less likely to cause leakage unintended by the operator even if the corresponding manual lever 6A, 6B, 6C, or 6D is subjected to the external force. Consequently, the valve unit 102 configured as above can suppress the toggle-type manual valves 1A, 1B, 1C, and 1D from causing leakage unintended by an operator.

Second Embodiment

Figure 16:
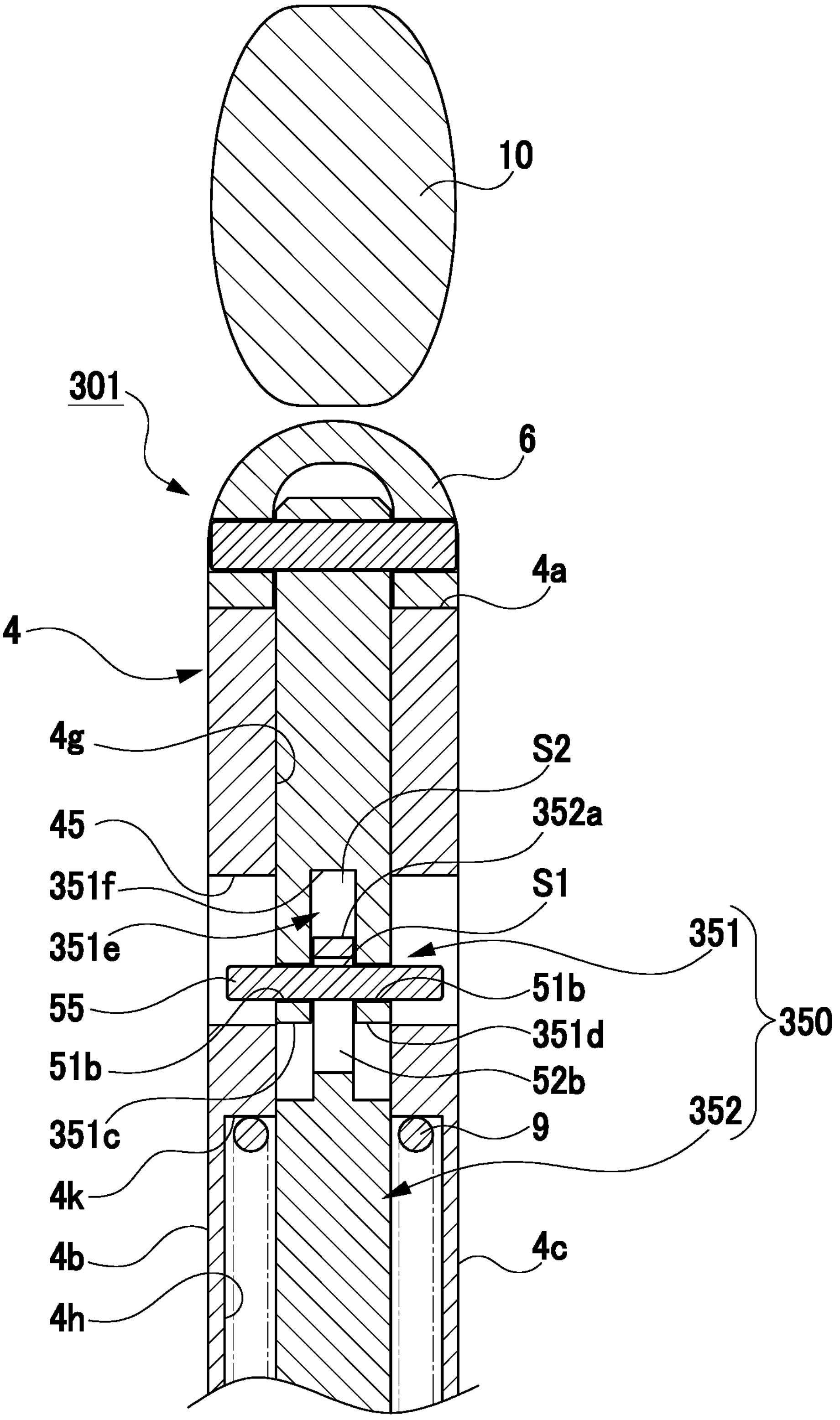
FIG. 16 is a cross-sectional view of a toggle-type manual valve in a second embodiment.
Figure 17:
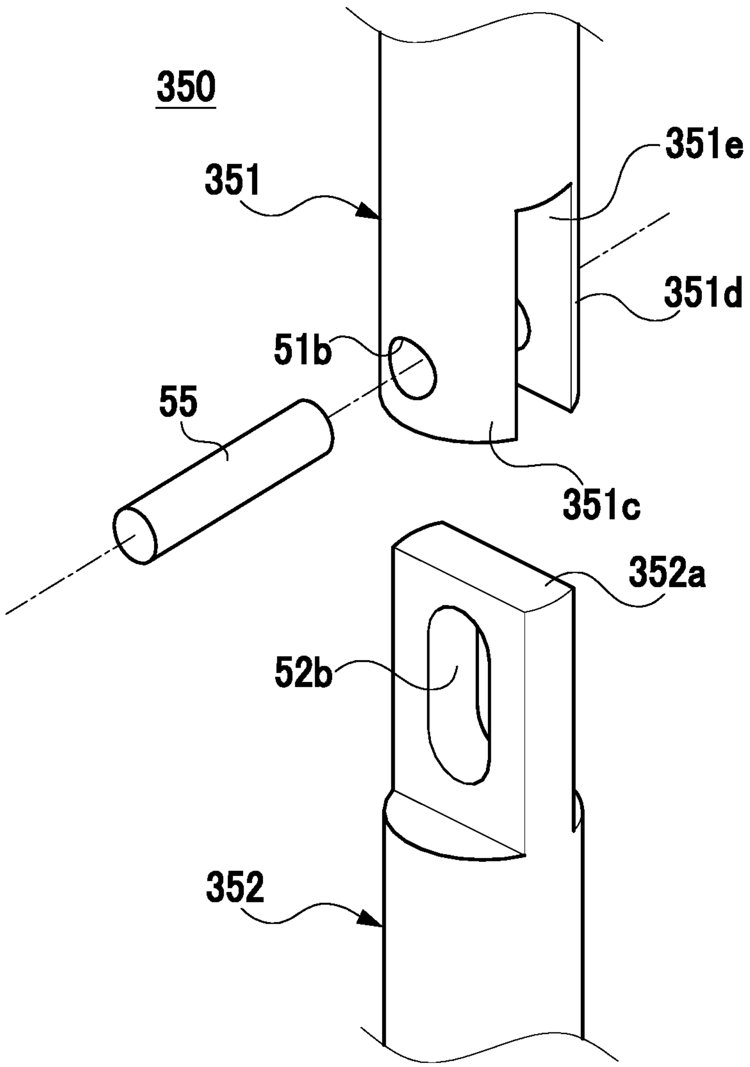
FIG. 17 is an explanatory view for a structure of connecting a first rod part and a second rod part.

Another embodiment of the toggle-type manual valve will be described referring to the accompanying drawings. FIG. 16 is a partial enlarged cross-sectional view of a toggle-type manual valve 301 in a second embodiment. FIG. 16 illustrates a valve closed state. FIG. 17 is an explanatory view for a structure of connecting a first rod part 351 and a second rod part 352.

In the toggle-type manual valve 301 in this embodiment, the first rod part 351 and the second rod part 352 are connected to each other while a plate-shaped protruding portion 352*a* of the second rod part 352 is placed between a pair of protrusions 351*c* and 351*d* of the first rod part 351. The toggle-type manual valve 301 is identical in configuration to the first embodiment, excepting that the first embodiment is configured such that the first protruding portion 51*a* and the second protruding portion 52*a* each having a semicircular cross-section are connected to each other. In the second embodiment, therefore, the following description is given with a focus on different configurations from the first embodiment, and the identical configurations to those of the first embodiment are explained and illustrated in the figures with the same reference signs as those in the first embodiment and their details are appropriately omitted.

The first rod part 351 and the second rod part 352 of the toggle-type manual valve 301 are similar in configuration to the first rod part 51 and the second rod part 52 of the first embodiment except for the pair of protrusions 351*c* and 351*d* and the plate-shaped protruding portion 352*a*.

The paired protrusions 351*c* and 351*d* are provided protruding toward the valve section 2 (toward the second rod part 352) at the end (one example of the first end portion) of the first rod part 351 located on the side close to the second rod part 352, that is, on the side of the first rod part 351 toward the valve section 2. The first rod part 351 is provided with a slit 351*e* between the paired protrusions 351*c* and 351*d*. The first rod part 351 is configured such that the paired protrusion 351*c* and 351*d* are located symmetric across the axis of the first rod part 351, and the slit 351*e* is located on the axis of the first rod part 351.

The plate-shaped protruding portion 352*a* is provided toward the opposite side from the valve section 2 (toward the first rod part 351) at the end (one example of the second end portion) located on the side close to the first rod part 351, that is, on the opposite side from the valve section 2. The plate-shaped protruding portion 352*a* is located on the axis of the second rod part 352. The plate-shaped protruding portion 352*a* is provided in a plate-like form along the diametrical direction of the second rod part 352. The plate-shaped protruding portion 352*a* has such a thickness as to be slidably inserted between the paired protrusions 351*c* and 351*d*, i.e., into the slit 351*e*.

Thus, the first rod part 351 and the second rod part 352 are formed with irregular end portions to be engaged with each other. The first rod part 351 and the second rod part 352 are placed coaxially by recess/protrusion engagement of the paired protrusions 351*c* and 351*d* and the plate-shaped protruding portion 352*a* in which the plate-shaped protruding portion 352*a* of the second rod part 352 is inserted between the paired protrusions 351*c* and 351*d*, that is, into the slit 351*e* within the region of the first hollow cavity portion 4*g*.

The plate-shaped protruding portion 352*a* is formed with an elongated hole 52*b*. This elongated hole 52*b* is formed extending long in the plate-shaped protruding portion 352*a* along the axis of the second rod part 352. The paired protrusions 351*c* and 351*d* are formed with fitting holes 51*b* at the positions corresponding to the elongated hole 52*b*. These fitting holes 51*b* are formed extending through the paired protrusions 351*c* and 351*d* in a direction perpendicular to the axis of the first rod part 351. The connecting pin 55 is press-fitted in the fitting holes 51*b* of the paired protrusions 351*c* and 351*d* and slidably placed in the elongated hole 52*b* of the plate-shaped protruding portion 352*a*. The connecting pin 55 is fixed to the paired protrusions 351*c* and 351*d* on both sides of the plate-shaped protruding portion 352*a*.

As shown in FIG. 16, in the toggle-type manual valve 301, when the manual lever 6 is located in the horizontal position and thus the valve section 2 is in the valve closed state, the gap S1 is formed between the connecting pin 55 and the internal surface of the elongated hole 52*b* located on the side opposite the valve section 2. In the toggle-type manual valve 301, when the valve section 2 is in the valve closed state, the gap S2 is formed between the distal end portion of the second rod part 352 and a bottom 351*f* of the slit 351*e*. Thus, an allowance formed by the gap S1 allows the toggle-type manual valve 301 to prevent fluid leakage due to accidental operations. In addition, an allowance formed by the gap S2 allows the toggle-type manual valve 301 to suppress the external force, except for the spring 9, from acting on the valve seat 25 during valve closing, thus preventing damage to the valve section 2.

The toggle-type manual valve 301 can have a compact valve size because the first rod part 351 and the second rod part 352 are connected within the first hollow cavity portion 4*g* in which a valve stem 350 is housed. In the toggle-type manual valve 301, furthermore, the connecting pin 55 is fixed to the paired protrusions 351*c* and 351*d* placed on both sides of the plate-shaped protruding portion 352*a*, so that when the first rod part 351 pulls the second rod part 352 toward the opposite side from the valve section 2 via the connecting pin 55 to open the valve, the load will almost equally act on the connecting pin 55. Therefore, even when the valve is repeatedly opened and closed, the connecting pin 55 is less likely to come off from the first rod part 351.

The art disclosed in the present description is not limited to the foregoing embodiment but may be modified variously. For instance, the toggle-type manual valve 1 may be used for any devices other than a semiconductor manufacturing device.

Figure 18:
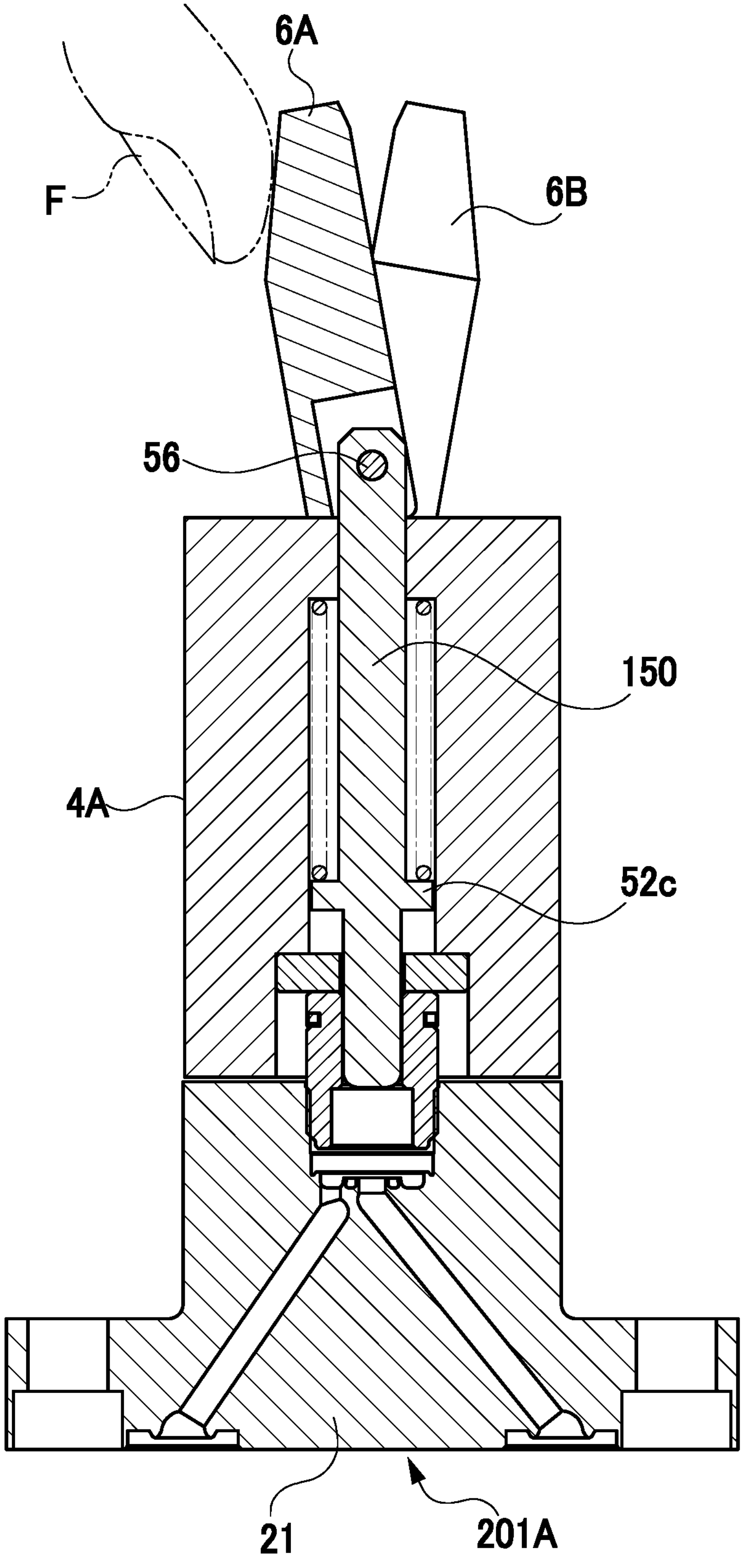
FIG. 18 is a cross-sectional view of a 4-section valve unit.

As shown as a toggle-type manual valve 201A in FIG. 18, a single, undivided valve stem 150 may be placed to be reciprocally linearly movable in a case 4A. However, the use of the valve stem 50, as in the foregoing toggle-type manual valve 1, ensures that even if the first rod part 51 moves axially as the manual lever 6 is turned, this movement is not transmitted to the second rod section 52. This can maintain the valve closed state without moving the second rod part 52 even if the first rod part 51 moves in the direction opposite the valve section 2 due to accidental operations of the manual lever 6.

Further, the manual lever 6 may be configured to stand vertically on the upper surface 4*a* of the case 4. However, when the manual lever 6 is turned to the standing direction to stand in a posture with the distal end portion 61 turned beyond the valve stem 50, further rotation is restricted by the second cam face 66. Accordingly, for a plurality of toggle-type manual valves 1 arranged contiguously to form the valve unit 102 as shown in FIG. 13, at the time of turning one standing manual lever 6C to the horizontal position, even if an operator accidentally touches the adjacent manual lever 6B or 6D, this adjacent manual lever 6B or 6D is not allowed to further turn. In this manner, only the toggle-type manual valve 1C, which is to be operated, is closed and the toggle-type manual valve 1B or 1D, which is not to be operated, is not closed, thus preventing accidental operations.

The first rod part 51 may be designed such that a part connected to the manual lever 6 has a columnar shape, and other parts have any other shapes than a round rod shape. However, the entire first rod part 51 formed in a round rod shape can improve the workability of mounting the first rod part 51 and increase the productivity of the first rod part 51 and the case 4.

REFERENCE SIGNS LIST

1 Toggle-type manual valve
2 Valve section
4 Case
6 Manual lever
9 Spring
50 Valve stem
51 First rod part
52 Second rod part
55 Connecting pin
52*b* Elongated hole

The invention claimed is:

1. A toggle-type manual valve comprising:

a valve section that opens and closes a flow channel;

a case connected to the valve section;

a valve stem supported by the case to be able to linearly reciprocate toward the valve section;

an urging member that urges the valve stem in a valve-section direction; and a manual lever pivotally supported to turn at an end of the valve stem on a side opposite the valve section, the toggle-type manual valve being configured to open and close the valve section by turning the manual lever, wherein:

the valve stem is divided into a first rod part connected to the manual lever and a second rod part located on a side close to the valve section, the first rod part and the second rod part having the same thickness, the case includes a first hollow cavity po which the first rod part and the second rod part are slidably supported, and a second hollow cavity portion continuous with the first hollow cavity portion and having a width larger than a width of the first hollow cavity portion, the width of the first hollow cavity portion at a first region supporting the first rod part being the same as the width of the first hollow cavity portion at a second region supporting the second rod part, a pin is fixed to one of the first rod part and the second rod part, and the other of the first rod part and the second rod part has an elongated hole extending in an axial direction of the valve stem, through which the pin is inserted slidably, wherein the first rod part has a first end portion located on a side close to the valve section and within the first hollow cavity portion, and formed with a first protruding portion protruding toward the second rod part, the second rod part has a second end portion located on a side opposite the valve section and within the first hollow cavity portion, and formed with a second protruding portion protruding toward the first rod part, and the pin is fixed to one of the first protruding portion and the second protruding portion, and the elongated hole is formed in the other of the first protruding portion and the second protruding portion.

2. The toggle-type manual valve according to claim 1, wherein the toggle-type manual valve has a thin rectangular parallelepiped outer shape with a width of 10 mm or less, and the manual lever is configured to pivot between a horizontal position, to which the manual lever is turned to a horizontal direction to close the valve section, and a standing position, to which the manual lever is turned to a standing direction to move the valve stem against the urging member.

3. The toggle-type manual valve according to claim 2, further comprising a lock rod member provided standing on an upper surface of the case on which the manual lever is placed, the lock rod member having an attachment hole configured to receive a padlock, and the manual lever being formed with an insertion hole through which the lock rod member is inserted.

4. The toggle-type manual valve according to claim 2, wherein the urging member urges the second rod part in the valve-section direction, and when the valve section is in a valve closed state, a first gap is provided between the pin and an internal surface of the elongated hole, located on a side opposite the valve section, and further a second gap is provided between the second rod part and the first rod part.

5. The toggle-type manual valve according to claim 2, wherein the first rod part and the second rod part are round rods.

6. The toggle-type manual valve according to claim 1, further comprising a lock rod member provided standing on an upper surface of the case on which the manual lever is placed, the lock rod member having an attachment hole configured to receive a padlock, and the manual lever being formed with an insertion hole through which the lock rod member is inserted.

7. The toggle-type manual valve according to claim 1, wherein the urging member urges the second rod part in the valve-section direction, and when the valve section is in a valve closed state, a first gap is provided between the pin and an internal surface of the elongated hole, located on a side opposite the valve section, and further a second gap is provided between the second rod part and the first rod part.

8. The toggle-type manual valve according to claim 1, wherein the first rod part and the second rod part are round rods.

9. The toggle-type manual valve according to claim 1, wherein the first protruding portion has a semicircular cross-section cut in a direction perpendicular to an axial direction of the first rod part, and the second protruding portion has a semicircular cross-section cut in a direction perpendicular to an axial direction of the second rod part.

10. The toggle-type manual valve according to claim 1, wherein the second protruding portion is a plate-shaped protruding portion provided in a plate shape along a diametrical direction of the second rod part, the first protruding portion includes a pair of protrusions placed on both sides of the plate-shaped protruding portion, and the elongated hole is formed in the plate-shaped protruding portion, and the pin is fixed to the pair of protrusions to extend in a direction perpendicular to an axis of the first rod part.

11. The valve unit according to claim 1, wherein an elongated guide hole extends through side walls of the case, the elongated guide hole being configured to slidably guide ends of the pin.

12. A toggle-type manual valve comprising:

a valve section that opens and closes a flow channel;

a case connected to the valve section;

a valve stem supported by the case to be able to linearly reciprocate toward the valve section;

an urging member that urges the valve stem in a valve-section direction; and a manual lever pivotally supported to turn at an end of the valve stem on a side opposite the valve section, the toggle-type manual valve being configured to open and close the valve section by turning the manual lever, wherein the valve stem is divided into a first rod part connected to the manual lever and a second rod part located on a side close to the valve section, a pin is fixed to one of the first rod part and the second rod part, the other of the first rod part and the second rod part has an elongated hole extending in an axial direction of the valve stem, through which the pin is inserted slidably, wherein the toggle-type manual valve further comprises a lock rod member provided standing on an upper surface of the case on which the manual lever is placed, the lock rod member having an attachment hole configured to receive a padlock, the manual lever is formed with an insertion hole through which the lock rod member is inserted, wherein the upper surface of the case is formed with a first mounting hole and a second mounting hole, in which the lock rod member can be mounted, at symmetric positions across the valve stem, the lock rod member can be selectively mounted in either the first mounting hole or the second mounting hole, and at least a part of the first rod part has a columnar shape, to which the manual lever is attached, and the manual lever can be attached in a reversed orientation across the first rod part.

13. The toggle-type manual valve according to claim 12, wherein the urging member urges the second rod part in the valve-section direction, and when the valve section is in a valve closed state, a first gap is provided between the pin and an internal surface of the elongated hole, located on a side opposite the valve section, and further a second gap is provided between the second rod part and the first rod part.

14. The toggle-type manual valve according to claim 12, wherein the toggle-type manual valve has a thin rectangular parallelepiped outer shape with a width of 10 mm or less, and the manual lever is configured to pivot between a horizontal position, to which the manual lever is turned to a horizontal direction to close the valve section, and a standing position, to which the manual lever is turned to a standing direction to move the valve stem against the urging member.

15. A valve unit in which a plurality of toggle-type manual valves are provided contiguously, wherein the plurality of toggle-type manual valves each comprise:

a valve section that opens and closes a flow channel;

a case connected to the valve section;

a valve stem supported by the case to be able to linearly reciprocate toward the valve section;

an urging member that urges the valve stem in a valve-section direction; and a manual lever pivotally supported to turn at an end of the valve stem on a side opposite the valve section, the toggle-type manual valve being configured to open and close the valve section by turning the manual lever, wherein the valve stem is divided into a first rod part connected to the manual lever and a second rod part located on a side close to the valve section, a pin is fixed to one of the first rod part and the second rod part, and the other of the first rod part and the second rod part has an elongated hole extending in an axial direction of the valve stem, through which the pin is inserted slidably, wherein the toggle-type manual valves are placed with the respective manual levers alternately oriented in opposite directions when the manual levers are pivoted to a horizontal direction to close the valve sections.

16. The valve unit according to claim 15, wherein each of the manual levers of the plurality of toggle-type manual valves has a stopper part to be restricted by the case from further turning in a posture with a distal end portion turned beyond the valve stem when the manual lever is pivoted to a standing direction.

17. The valve unit according to claim 15, wherein the toggle-type manual valves each have a thin rectangular parallelepiped outer shape with a width of 10 mm or less, and the manual lever is configured to pivot between a horizontal position, to which the manual lever is turned to a horizontal direction to close the valve section, and a standing position, to which the manual lever is turned to a standing direction to move the valve stem against the urging member.

* * * * *